Figure 1:
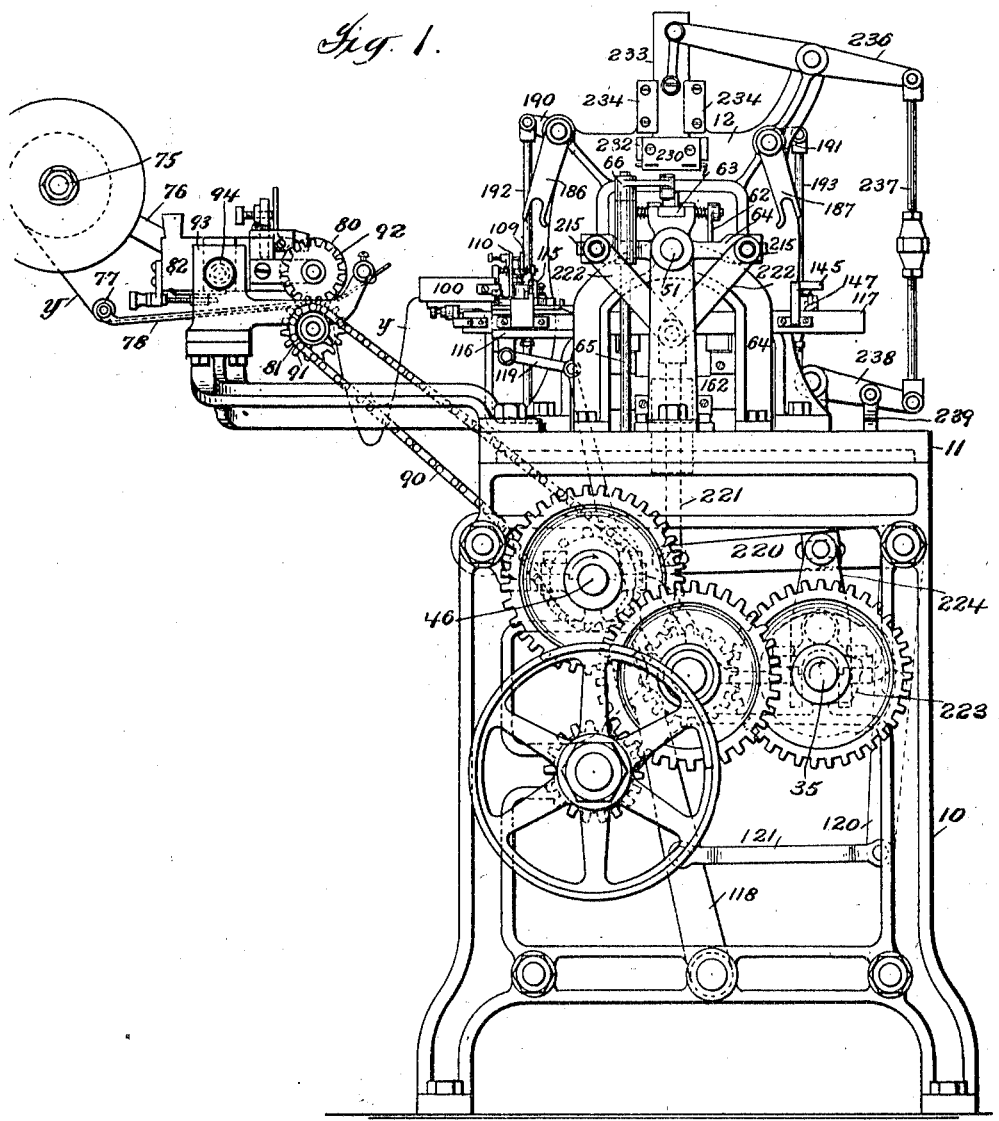

F. R. HARRIS.
BOX MAKING MACHINE.
APPLICATION FILED NOV. 25, 1903.

1,088,899.

Patented Mar. 3, 1914.
14 SHEETS—SHEET 1.

Attest:
J. A. Graves.
Geo. T. Kennedy.

Inventor.
Fred R. Harris
by Philipp, Sawyer, Rice & Kennedy
Attys.

F. R. HARRIS.
BOX MAKING MACHINE.
APPLICATION FILED NOV. 25, 1903.

1,088,899.

Patented Mar. 3, 1914.
14 SHEETS—SHEET 3.

Attest:
J. E. Graves.
W. S. Kennedy

Inventor:
Fred R. Harris
by Philipp Langer Rice & Kennedy
Attys

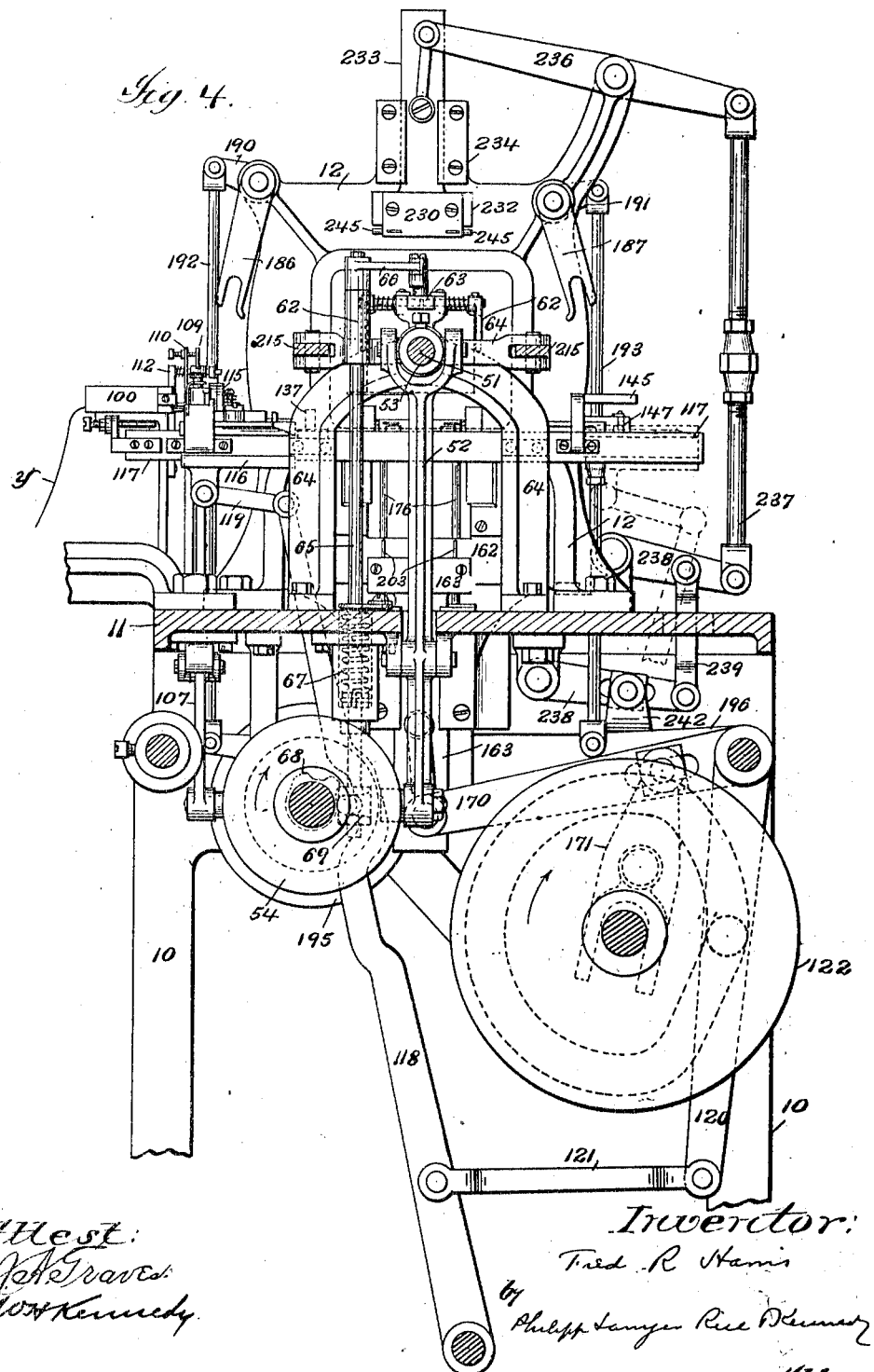

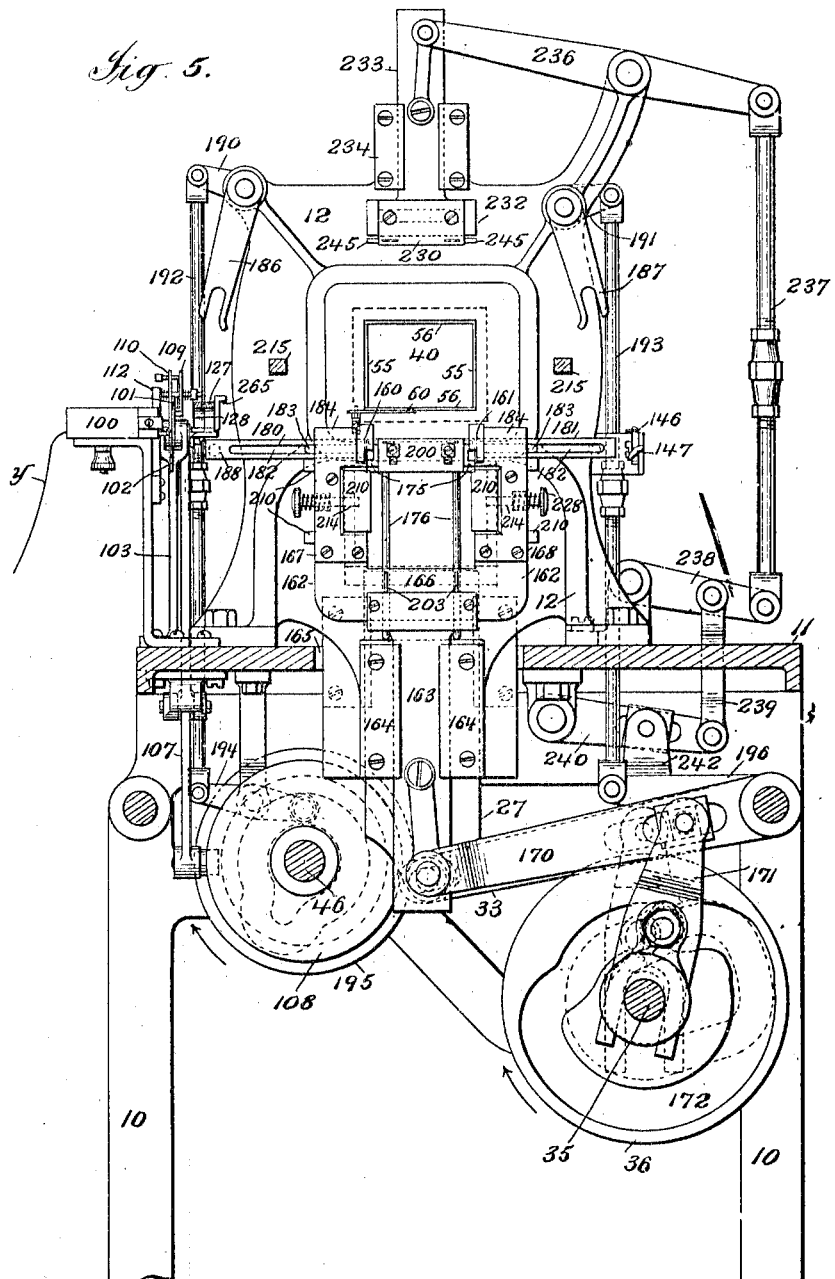

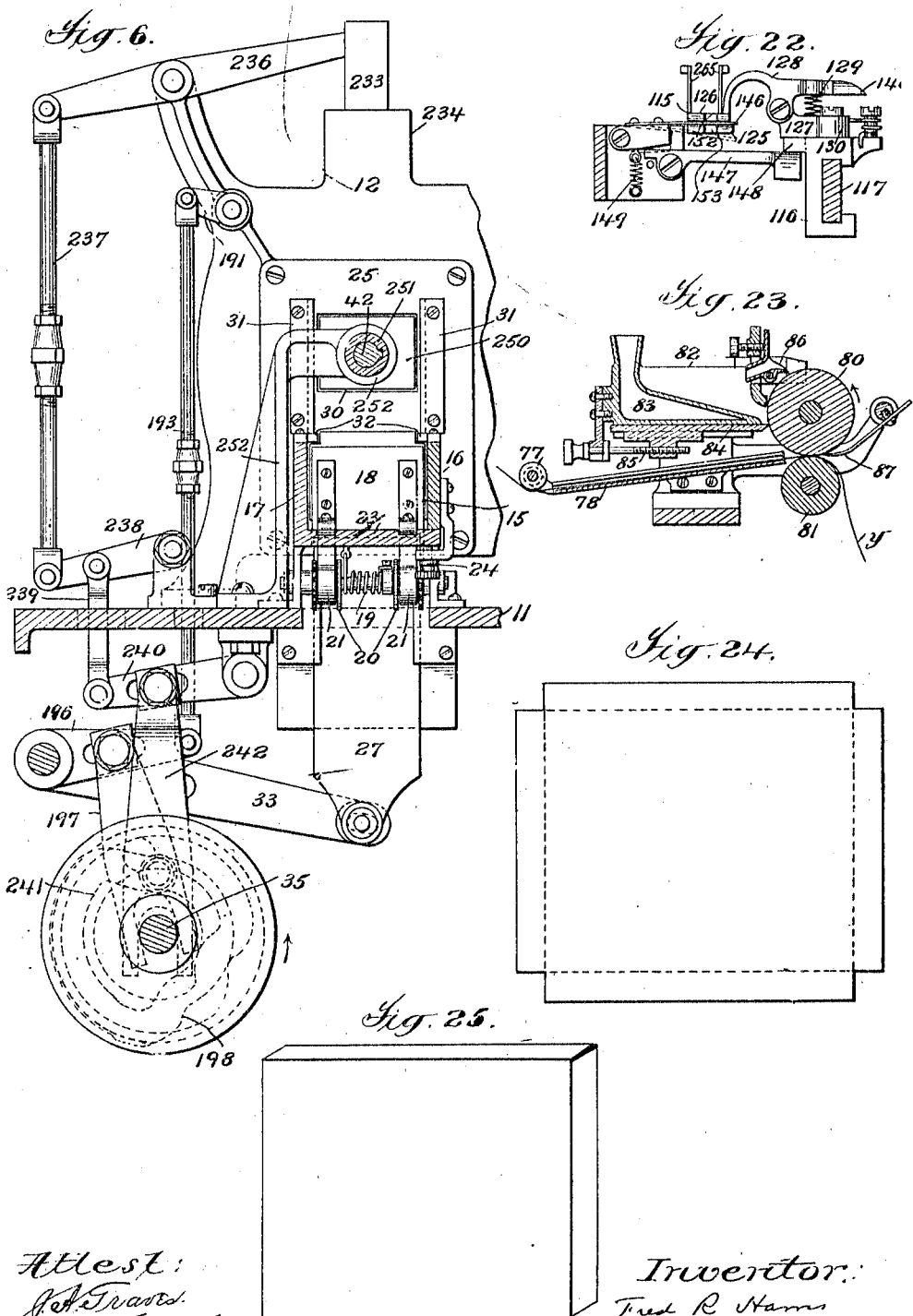

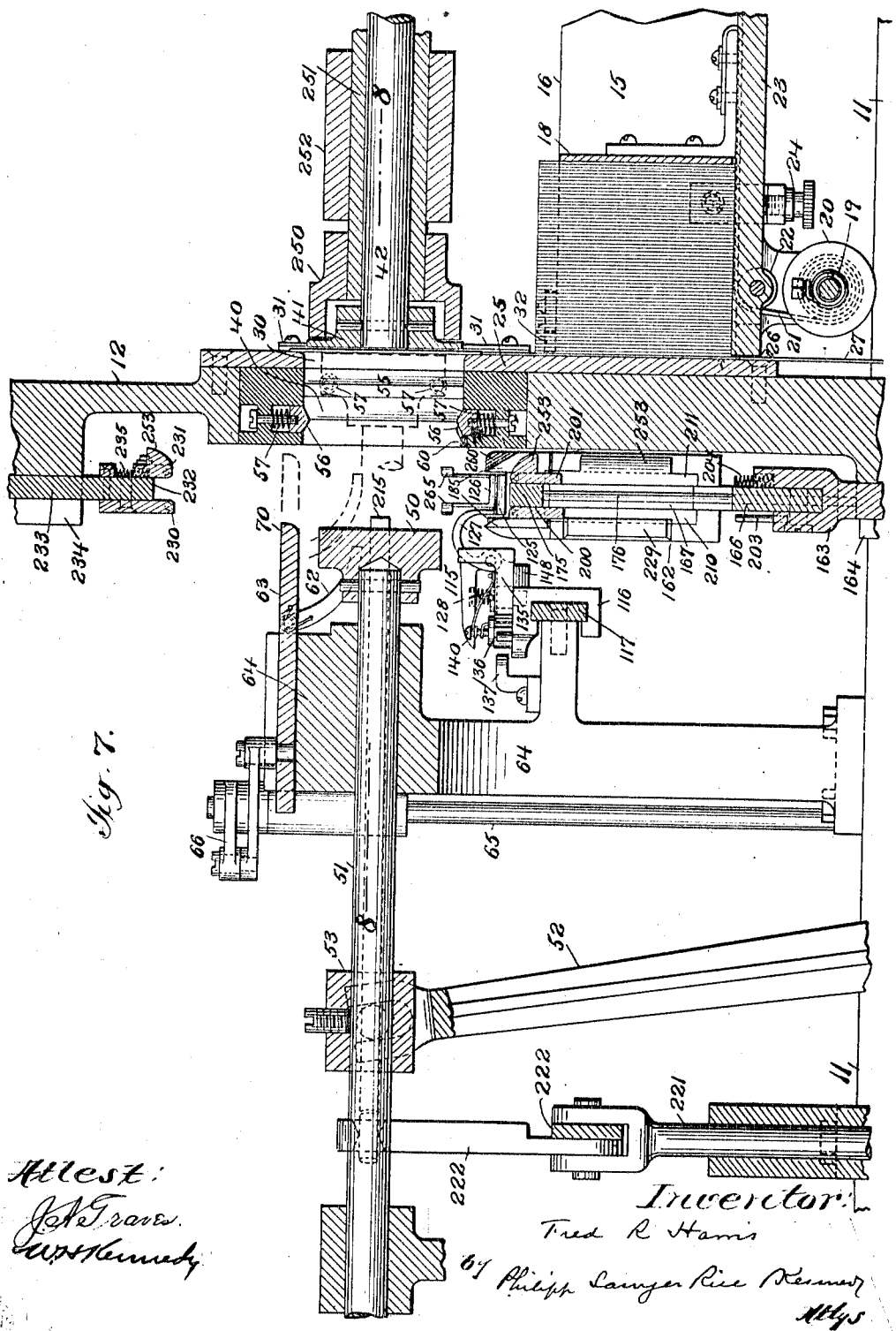

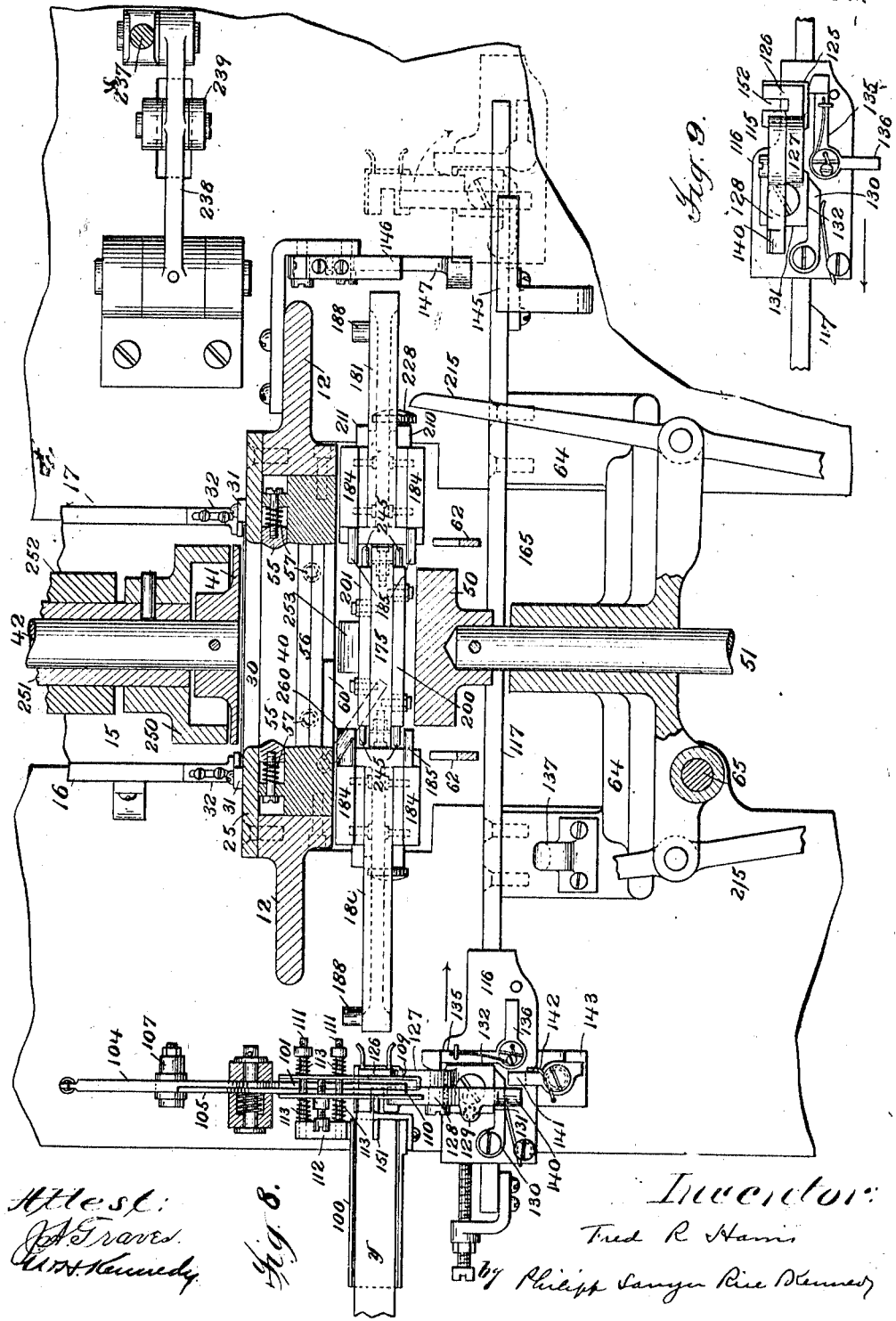

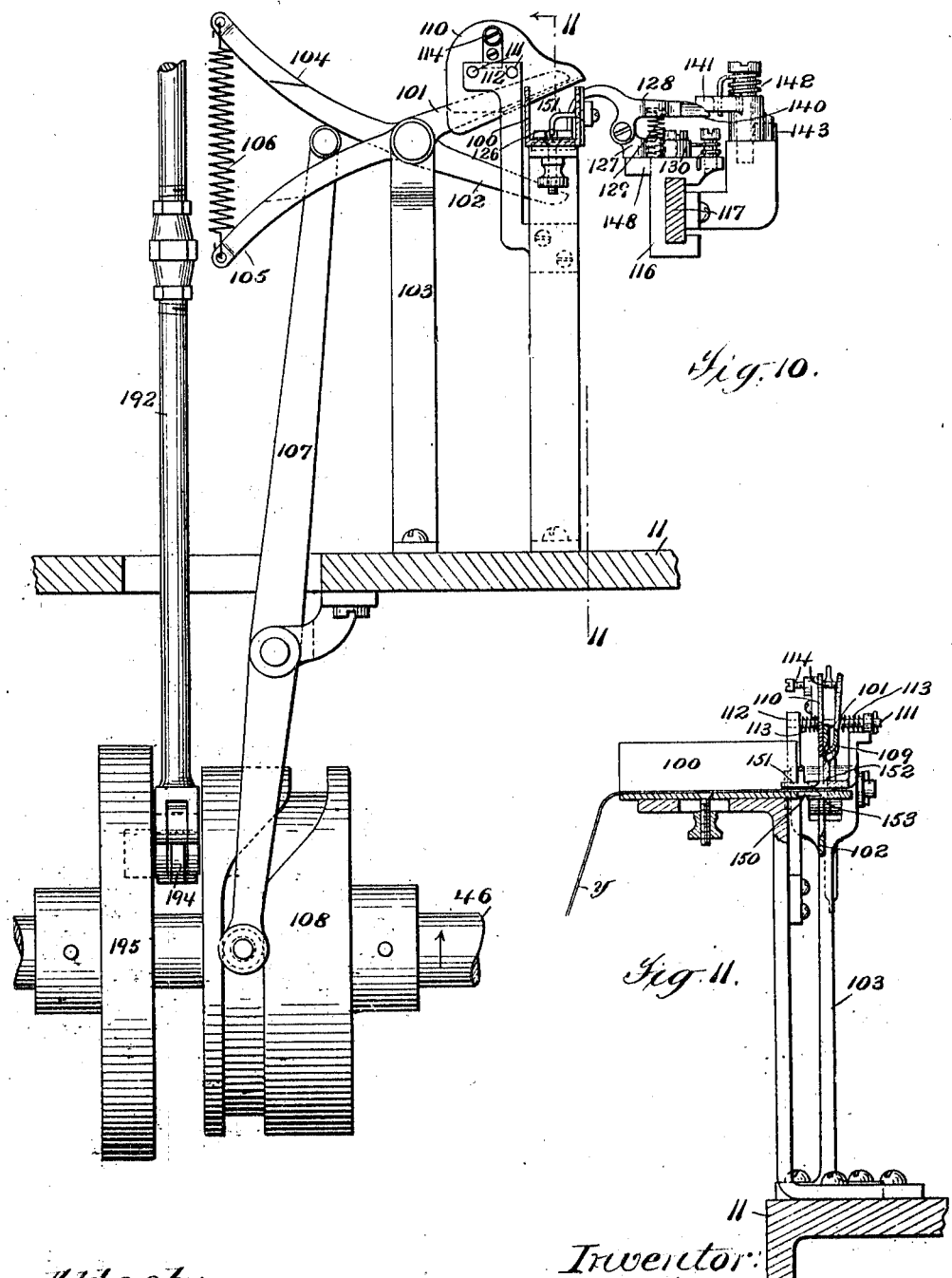

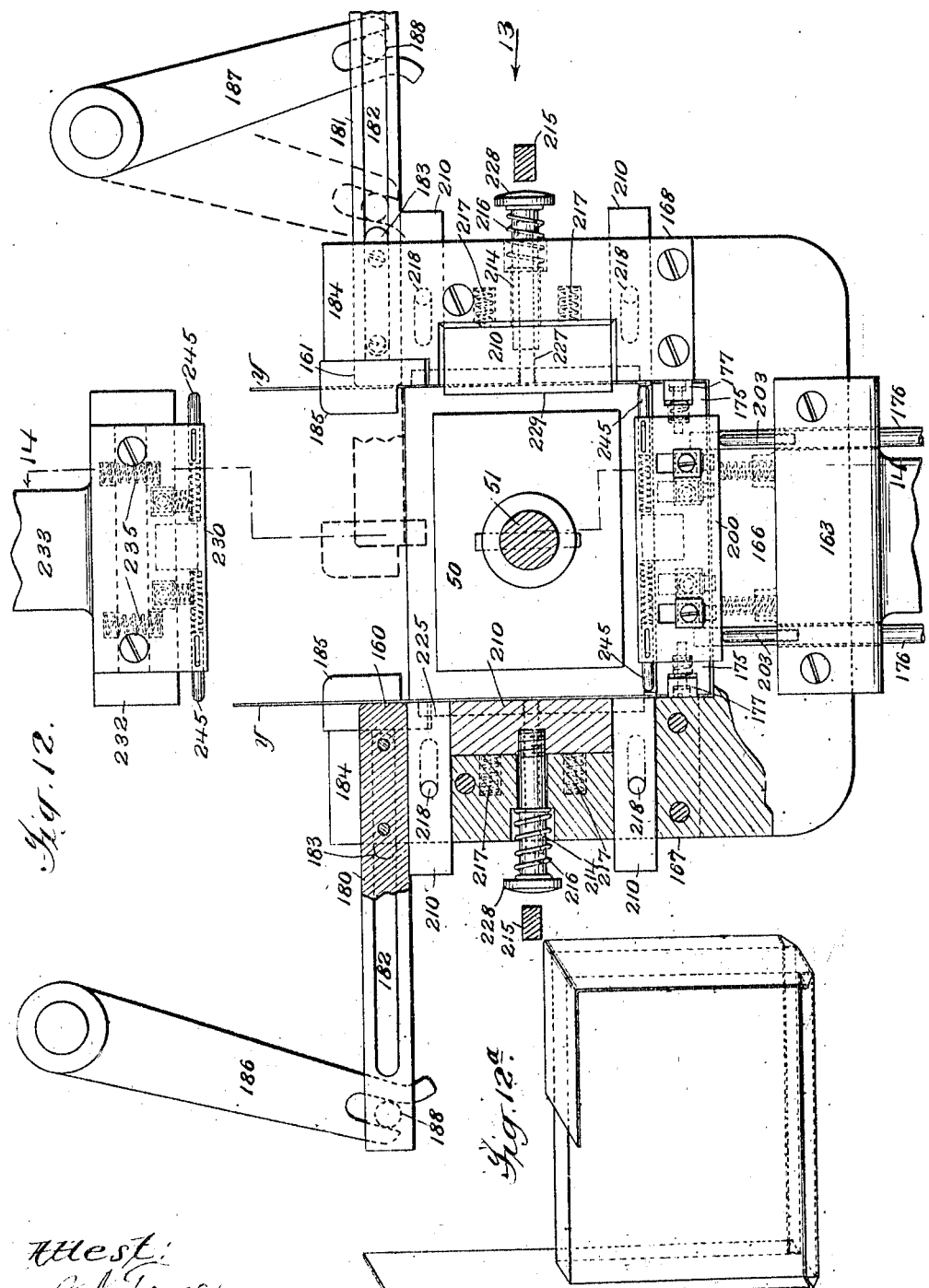

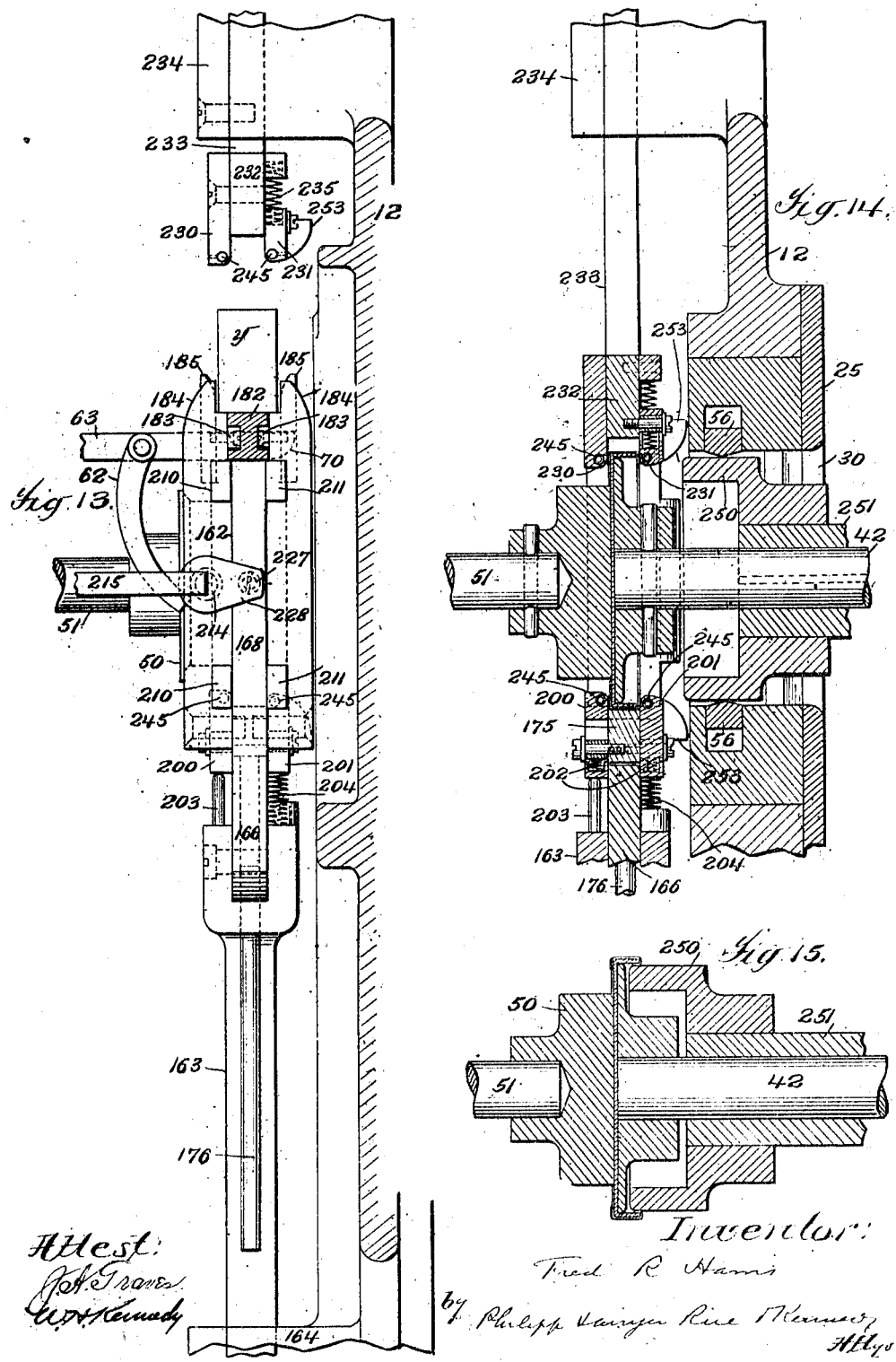

F. R. HARRIS.
BOX MAKING MACHINE.
APPLICATION FILED NOV. 25, 1903.

1,088,899.

Patented Mar. 3, 1914.
14 SHEETS—SHEET 12.

Attest:
J. H. Travis.
W. H. Kennedy.

Inventor:
Fred R Harris
by Philipp Sawyer Rice Kennedy
Attys

F. R. HARRIS.
BOX MAKING MACHINE.
APPLICATION FILED NOV. 25, 1903.

1,088,899.

Patented Mar. 3, 1914.
14 SHEETS—SHEET 13.

Attest:

Inventor:
Fred R Harris
by Philipp Sawyer Rice & Kennedy
Attys

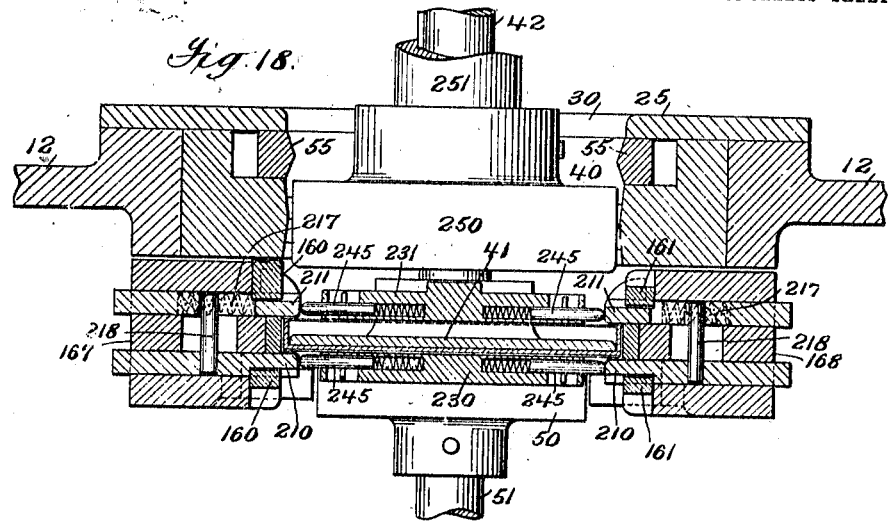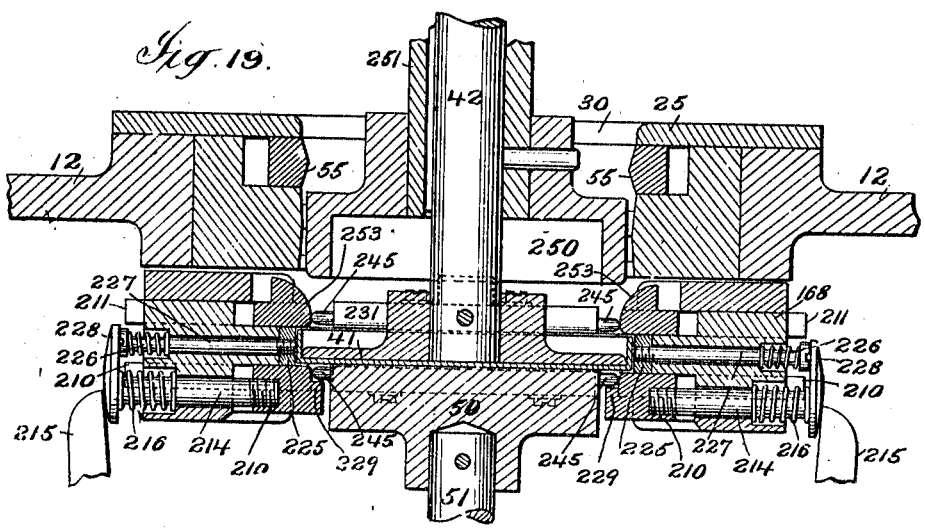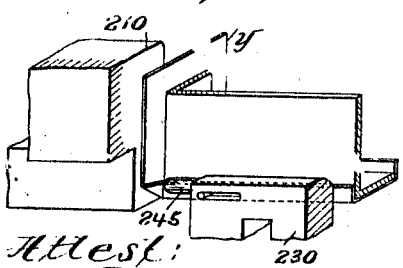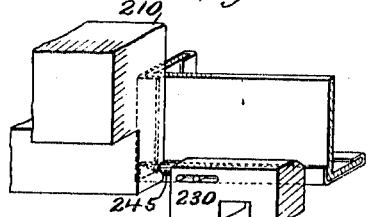

UNITED STATES PATENT OFFICE.

FRED R. HARRIS, OF NEW YORK, N. Y., ASSIGNOR TO THE AMERICAN TOBACCO COMPANY, OF JERSEY CITY, NEW JERSEY, A CORPORATION OF NEW JERSEY.

BOX-MAKING MACHINE.

1,088,899.  Specification of Letters Patent.  Patented Mar. 3, 1914.

Application filed November 25, 1903. Serial No. 182,569.

*To all whom it may concern:*

Be it known that I, FRED R. HARRIS, a citizen of the United States, residing at the city of New York, county of New York, and State of New York, have invented certain new and useful Improvements in Box-Making Machines, fully described and represented in the following specification and the accompanying drawings, forming a part of the same.

This invention relates to machines for making boxes or box covers having a bottom section, or a top section, as the case may be, of polygonal form, and more particularly of rectangular form, and having side sections extending from the edges of the bottom or top, and having a covering strip of paper or other suitable material applied to such sides, one edge of such covering strip being bent over against the bottom, or top, of the box, and the other edge of the covering strip being turned on the edges of the box sides and bent inward against the inner faces of such edges.

Although, as stated, the invention may be employed in machines for making either box bodies or box covers, the term "box" will be used herein in a general sense to include both, and the term "bottom" or "bottom section" will be used to designate the part of the box from which the side sections extend.

The invention aims generally to provide a machine of this class by which a high class product may be produced, and which shall be capable of operating at a high rate of speed.

A preferred form of machine embodying the various features of the invention is adapted to feed box blanks successively from a holder, bend the side sections of the blanks to stand at right angles to the bottom section, feed a covering strip of sufficient length from a continuous web, apply paste thereon, apply the covering strip to the box sides, turn the edges of the covering strip and secure them in position, and finally eject the completed box from the machine. Such a machine, it will be seen, not only applies the covering strip to the sides of the box, but also forms the box from a blank, the covering strip serving in such case to hold the bent-up sides of the box in position. It will be understood, however, that features of the invention relating to applying the covering strip to the box sides might be employed equally well for applying a covering strip to a box having its sides secured in position by other means, or to a box previously formed.

A full understanding of the invention can best be given by a detailed description of a completely organized machine of preferred form embodying all the features of the invention, and such a description will now be given in connection with the accompanying drawings showing such a machine, in which—

Figure 2:
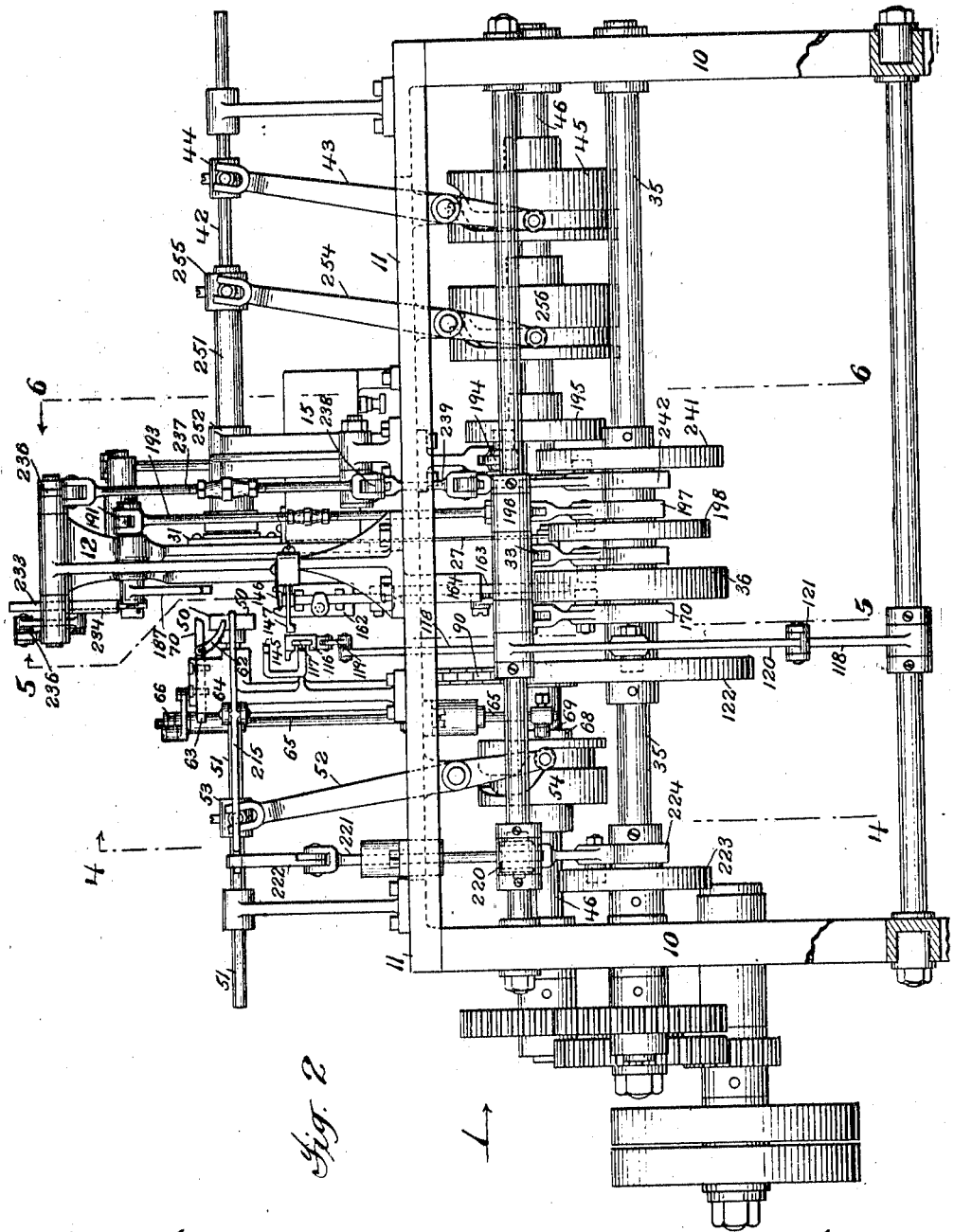
Figure 3:
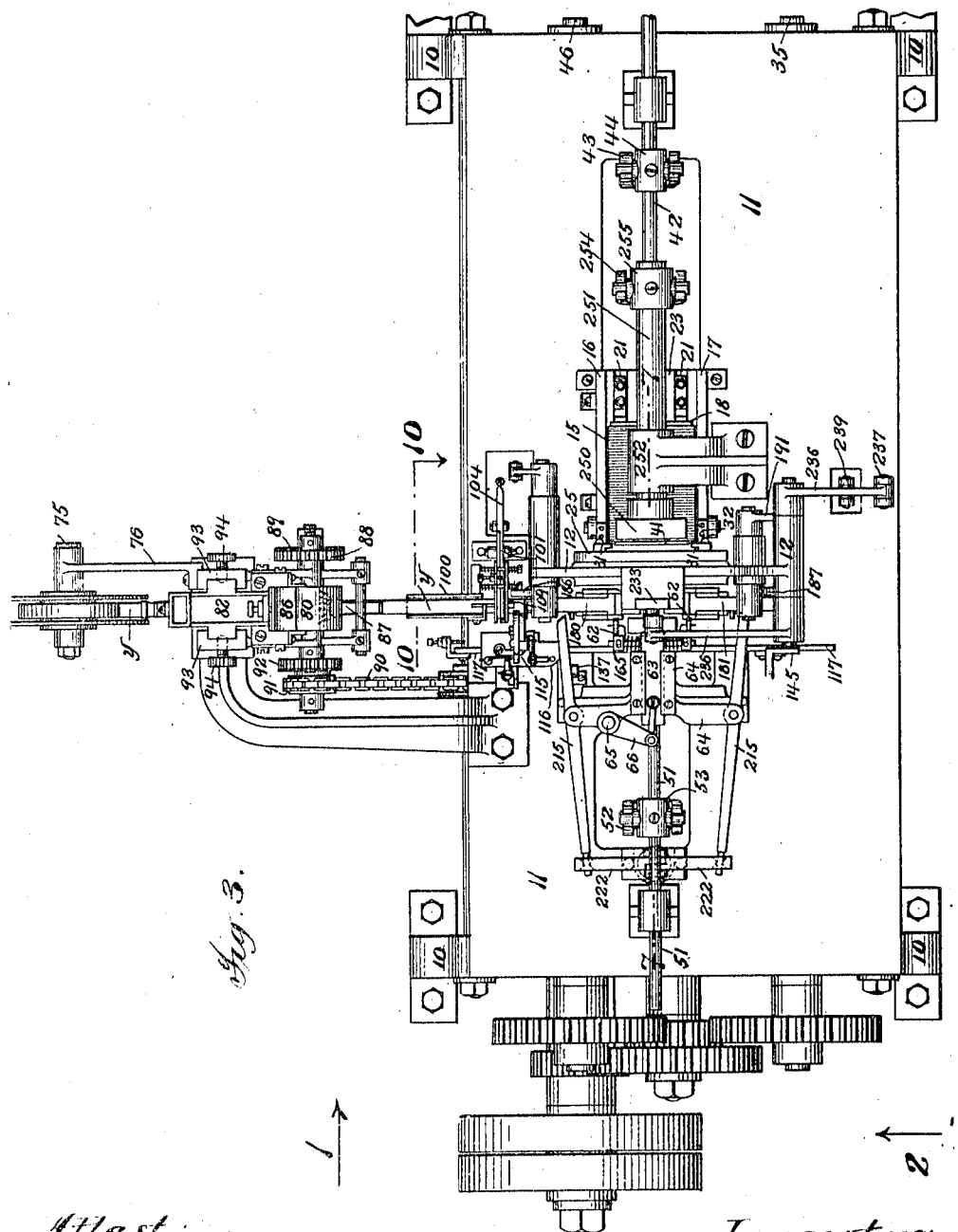
Figure 16:
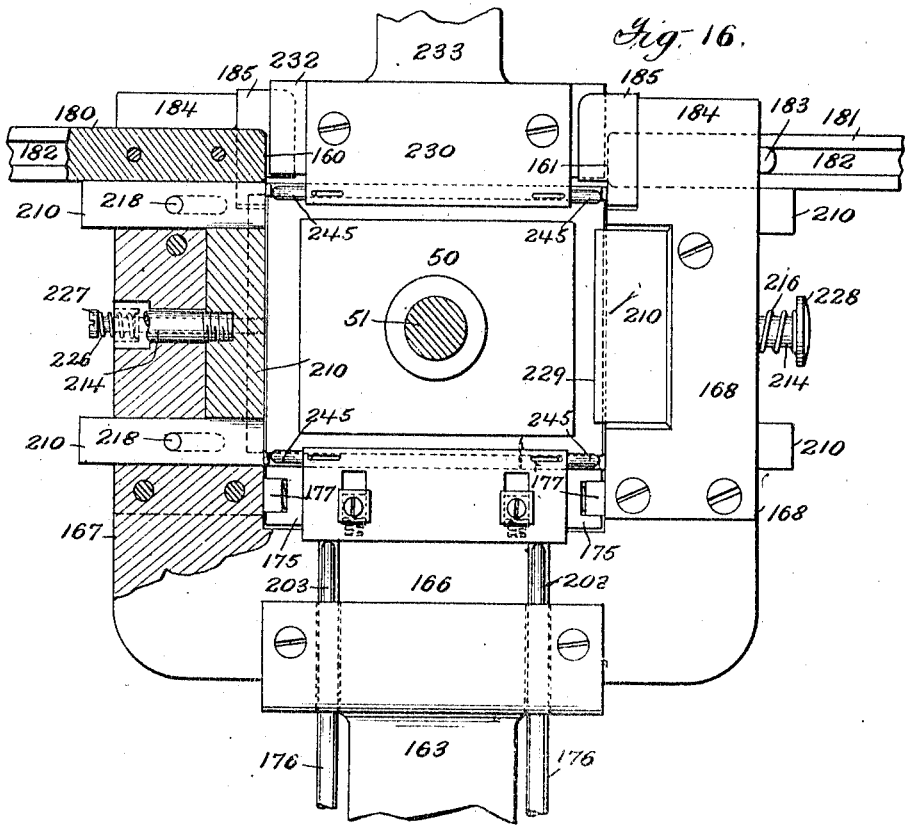
Figure 16A:
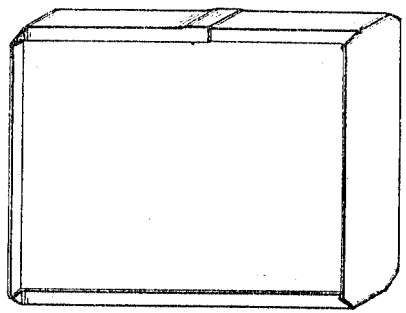
Figure 17:
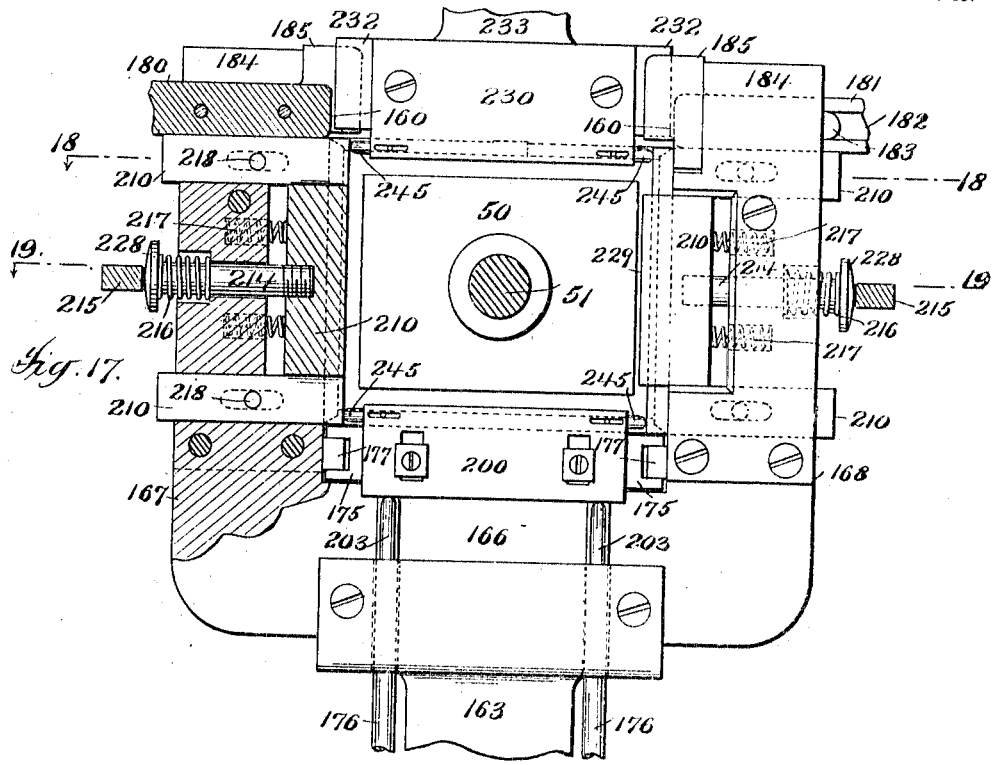
Figure 17A:
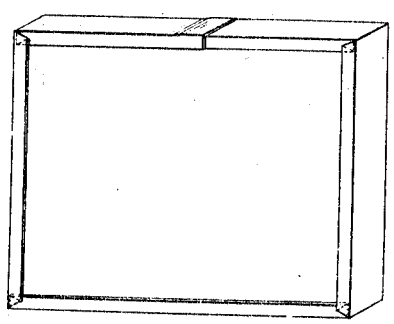
Figure 17B:
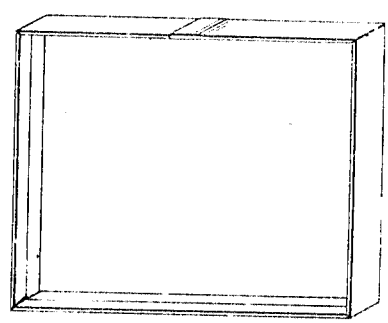

Figure 1 is an end elevation of the machine looking in the direction of the arrow 1 of Fig. 3. Fig. 2 is a side elevation looking in the direction of the arrow 2 of Fig. 3. Fig. 3 is a plan view. Figs. 4, 5 and 6 are sections on an enlarged scale taken on lines 4, 5 and 6 respectively, of Fig 2. Fig. 7 is a longitudinal section on a further enlarged scale taken on line 7 of Fig. 3. Fig. 8 is a horizontal section taken on line 8 of Fig. 7. Fig. 9 is a detailed plan view showing the device for drawing the covering strip into position. Fig. 10 is a view taken on line 10 of Fig. 3 showing the covering strip positioning and severing means. Fig. 11 is a section on line 11 of Fig. 10. Fig. 12 is a face view, partly in section, of the box forming and covering devices. Fig. 12$^a$ is a perspective view of the box with the covering strip partly applied thereto as when the covering devices are in the position shown by the full and dotted lines in Fig. 12. Fig. 13 is a detail view of the covering strip applying devices looking in the direction of the arrow 13 of Fig. 12. Fig. 14 is a sectional view of the same taken on line 14 of Fig. 12. Fig. 15 is a detail sectional view of parts shown in Fig. 14 in position after the plunger by which the edge of the covering strip is folded inward has made its folding movement. Fig. 16 is a face view of parts shown in Fig. 12 showing the parts in a different position. Fig. 16$^a$ is a perspective view of the box with the covering strip partially applied thereto as when the folding devices are in the position shown in Fig. 16. Fig. 17 is a view similar to Fig. 16, but showing the parts in position when the folding of the edges of the covering strip have been completed. Figs. 17$^a$ and 17$^b$ are perspective views showing the outside and inside of the completed box. Figs. 18 and 19 are horizontal sections taken on lines 18 and 19 respectively of Fig. 17. Figs. 20 and 21 are enlarged detail views of devices whereby a smooth corner fold of the covering strip against the bottom of the box is secured. Fig. 22 is a detail view of the covering strip positioning device. Fig. 23 is a detail sectional view of the pasting mechanism for applying paste to the covering strip. Fig. 24 is a face view of one of the box blanks. Fig. 25 is a perspective view of the same after its side sections have been bent into position.

Referring to the drawings, the various parts of the machine are supported by a suitable frame 10, platform 11 and vertical frame 12 extending upward from the platform. The machine shown is intended for forming rectangular boxes from blanks of the form shown in Fig. 24. The blanks are placed in a blank holder 15 (see Figs. 2, 3, 6 and 7) in which they stand on edge, being guided by the sides 16 and 17 of the holder, and as successive blanks are taken from the holder the supply of blanks is fed forward by means of a sliding follower 18 which is preferably spring pressed, as by means of a coiled spring 19 acting on a shaft which carries a pair of pulleys 20 on which are coiled belts 21 which pass from the pulleys 20 over guide rolls 22 and thence horizontally in grooves in the bottom 23 of the holder and have their ends secured to the sliding follower 18. One of the sides of the holder, as 16, is preferably removable to permit free access to the interior of the holder in case the blanks should become jammed or for any desired purpose. The removable side 16 may be secured in position in any suitable manner, as by means of a depending arm and clamping screw 24, as shown in Fig. 6.

The front wall of the holder against which the end blank is held by the follower 18 is formed by a vertical plate 25 secured to the frame 12 and extending above the holder, as shown in Figs. 6 and 7. Between the end of the bottom 23 of the holder and the plate 25, there is left a narrow slot 26 through which reciprocates a vertical blank feeding slide 27 of a thickness about equal to the thickness of a box blank. By the upward movement of the slide 27, the end blank of the pile in the holder is moved upward against the face of the plate 25 and into position opposite an opening 30 in said plate, the blank being guided in such upward movement by edge guides 31. For preventing the upward movement of more than one blank at a time, retaining shoulders 32 are provided to bear against the upper edges of the blanks in the holder and set so as to leave only sufficient space between such retaining shoulders and the plate 25 to permit a single blank to pass through. These shoulders 32 are preferably adjustable, as indicated in Fig. 3 to permit of their being set for blanks of slightly varying thickness. The blank feeding slide 27 as shown is reciprocated by means of a lever 33, which is oscillated by means of a pitman pivotally connected thereto and having its other end forked to embrace a cam shaft 35 and having a cam roll which runs in a face cam groove of a cam disk 36 on the cam shaft 35, as shown in dotted lines in Fig. 5. The opening 30 is of a size and form corresponding to the outside of the box to be formed and forms part of a folding or die opening 40 which extends through the frame 12. After the box blank has been fed upward into position opposite the die opening, it is forced through such opening by means of a forming plunger 41 having its face of a size and form corresponding to the inner dimensions of the box. This plunger 41 is carried by a plunger rod 42 mounted to reciprocate horizontally and given its reciprocating movement by means of a lever 43 having a double forked upper end to engage pins on the plunger rod, said pins being preferably carried by an adjustable collar 44. The lower end of the lever 43 carries a cam roll running in the groove of a peripheral cam disk 45 mounted on a cam shaft 46.

For supporting and holding the blank against the plunger 41, a clamping plunger 50 is provided carried by a horizontally reciprocating plunger rod 51 which is reciprocated by means of a lever 52 having a double forked end to engage pins on the plunger rod, said pins being preferably carried by an adjustable collar 53 on said rod. The lower end of the lever 52 carries a cam roll running in the groove of a cam 54 on the shaft 46. The cams actuating the plungers 41 and 50 are so formed that from the positions of rest shown by full lines in Fig. 7, the clamping plunger 50 is first moved forward to the position shown in dotted lines in said figure to clamp a box blank against the face of the plunger 41, and the two plungers then move to the left in said figure to carry the blank through the die opening 40, and come to rest again in the position shown in Fig. 14 after the box has been carried clear of the die opening. The covering strip is applied to the box while in this position, and after the box is completed the plunger 41 moves to the right and the plunger 50 to the left to the positions shown in full lines in Fig. 7. It will be seen that in the passage of the box blank through the die opening, the side sections of the blank are folded to stand at right-angles to the bottom section, as shown in Fig. 25.

For securing a better and sharper folding of the side sections of the box blanks, the sides of the die opening 40 are preferably provided with presser strips or bars 55 and 56, the presser strips 55 being arranged in the vertical sides of the die opening and the presser strips 56 in the horizontal sides, and the two sets of presser strips being in different planes so as to avoid interference. The presser strips are formed with inclined faces, as shown, and are mounted to extend normally inward beyond the sides of the die opening, being held in such position under yielding tension, as by means of springs 57. As the box blank is forced by the plunger 41 through the die opening, these presser strips 55 and 56 will bear against the bent side sections of the blank and thereby aid in setting said sections in their bent-up position.

In order to prevent the side sections of the box blank from springing outward again as the blank is carried clear of the die opening by the plungers, holding devices are provided for engaging and holding such side sections in position. For this purpose, as shown, a horizontally swinging finger 60 is provided to engage the lowermost side of the box, said finger being pivotally mounted in the frame of the die opening and normally standing in the position shown in Figs. 5 and 7 and by full lines in Fig. 8. As a folded box blank is carried through the die opening by the plungers 41 and 50, the lowermost folded side thereof will engage the finger 60 and swing it outward to the position shown by dotted lines in Fig. 8, the finger then bearing against such lowermost side of the box and holding it in its folded position. To insure such outward swing of the finger 60 by contact with the side of the box blank, the end of the finger is bent upward slightly, as shown in Fig. 5. This upwardly bent end will be engaged by the box side, the finger then yielding slightly as it is swung outward so that the upwardly bent end will pass under the box side.

For holding the vertically standing side sections of the box blank in their bent or set-up position, a pair of holding fingers 62 is provided, (see Figs. 2, 3, 7 and 8). These fingers 62 are carried by a slide 63 mounted to slide horizontally in a bracket 64 extending upward from the platform 11, which slide, as the plungers advance to carry the box blank through the die opening, stands in its rearward position to hold the fingers 62 in the position shown in dotted lines in Fig. 7, and is reciprocated for withdrawing the fingers from the box sides for the purpose hereinafter explained. The slide 63 may be reciprocated by any suitable means. As shown, it is reciprocated by means of a vertical rock shaft 65 carrying an arm 66 having a link connection with the slide 63, as shown in Figs. 3 and 7, said shaft being rocked against the tension of a spring 67, (see Fig. 4), by means of a cam 68 on the cam shaft 46, said cam acting on a cam roll carried by an arm 69 on the lower end of the shaft 65.

For holding the uppermost horizontal side of the box blank in its folded position, the slide 63 is preferably extended to form a top holding finger 70, which, when the slide has been moved rearwardly, or to the right in Fig. 7, extends in position to engage the uppermost side of the box blank as the latter is advanced from the die opening 40, as indicated by dotted lines in Fig. 7.

Any suitable mechanism may be employed for placing a covering strip in position to be applied to the folded blank, such position being preferably beneath the blank, and the folding device being arranged to fold the ends of the strip upward about the vertically standing sides of the blank and over the upper horizontal side of the blank. Preferably, however, a gripping device is provided which draws the covering strips lengthwise into position, and this gripping device is preferably a reciprocating gripper, and the covering strip is preferably drawn by such gripper from a web or continuous strip of covering material, means being provided for severing covering strip lengths from the continuous strip, and pasting mechanism being also preferably provided for applying paste to the inner side of the strip. The covering strip pasting, severing and positioning devices will now be described.

The strip of covering material $y$ is drawn from a web roll supported on a shaft or pin 75 carried by a bracket 76, and passes beneath a guide-roll 77 through a guide-way 78, from which guide-way it passes between feeding rolls 80 and 81, the upper roll 80 being also a pasting roll by which paste is applied to the upper side of the covering strip. Any suitable means may be provided for supplying paste to the roll 80. As shown, the roll 80 is mounted to rotate past an opening in a paste fountain 82 (see Figs. 1 and 23). The paste fountain is preferably provided with means for maintaining the paste therein heated, as by having its bottom formed with a chamber 83 for holding a liquid which may be heated by any suitable means. A slide 84 is mounted to project slightly beyond the main bottom of the fountain with its forward edge adjacent to the periphery of the roll 80, and is adjustable, as by means of a screw 85, for varying the amount of paste carried forward by the roll 80. An adjustable scraper 86 is also preferably provided for clearing the surface of the pasting roll. For insuring the covering strip leaving the pasting roll as the strip advances from between the rolls 80 and 81, a forked finger 87 is preferably provided as shown in Figs. 20 and 23. The rolls 80 and 81 are geared to rotate together by means of gears 88 and 89 (see Fig. 3), and are driven by a sprocket chain 90 running on a sprocket wheel fast on the shaft 46 and a sprocket wheel loose on the shaft of the roll 81. Connected with the sprocket wheel on the shaft of the roll 81 is a gear 91 which meshes with a gear 92 fast on the shaft of the roll 80. These sprocket wheels and gears are timed to drive the feed roll with a surface speed sufficient to feed at each rotation of the shaft 46 a length of covering material sufficient for a single covering strip. The paste fountain is preferably mounted in vertical guides 93 in which it is held by means of set screws 94, thus permitting it to be adjusted to cause the feeding and pasting roll 80 to bear with greater or less pressure on the covering material as the latter passes between said roll and the roll 81. From the feeding rolls 80 and 81, the covering strip passes through a guide-way 100 and thence between pivoted shear blades 101 and 102 (see Figs. 8, 10 and 11) by which lengths of covering material are severed from the strip. The shear blades are pivotally mounted on a bracket 103 and are provided with actuating arms 104 and 105 connected by a spring 106 and moved against the tension of the spring to separate the shear blades by means of an anti-friction roll carried by a lever 107, the other end of which lever travels in the groove of a peripheral cam 108 mounted on the shaft 46. In order to clear the upper plate 101 of paste which may collect thereon from the pasted covering strip, a scraping plate 109 is preferably provided, said plate being yieldingly mounted and having a bent or flanged edge to scrape over the edge and inclined side of the shear blade. A plate 110 is also preferably provided to engage the other side of the shear blade. For yieldingly supporting said plates, they are preferably hung on pins 111 projecting from a bracket 112 and carrying springs 113 which press the plates 109 and 110 toward each other. An adjusting screw 114 is also preferably provided for holding the upper portions of the plates apart and thereby forcing their lower or operative edges toward each other under the pressure of the springs 113. The guide-way 100 is set a sufficient distance from the feeding rolls 80 and 81 to permit the strip of covering material as it is fed from between the feeding rolls to fall in a loop between the feeding rolls and said guide-way, and lengths of covering material sufficient for covering a box are drawn through said guide-way at intervals by a reciprocating gripper 115. The gripper 115 is carried by a slide 116 mounted on a horizontal guide 117 (see Figs. 1, 2, 3, 4, 7, 8, 9, 10 and 22), said slide being reciprocated by means of a lever 118 connected to the slide by a link 119 and oscillated for reciprocating the slide by means of a lever 120 connected thereto by a link 121 and carrying a roll running in a groove of a cam disk 122 (see Figs. 1, 2 and 4).

The gripper 115 is formed by means of gripping jaws 125 and 126 having horizontal co-acting gripping faces. The lower gripping jaw 125 is carried by an arm 127 pivoted to swing horizontally on the slide 117, and the upper gripping jaw is carried by an arm 128 pivoted to oscillate vertically on the arm 127, and the gripper 126 is normally pressed toward the gripper 125 by means of a spring 129. When in operative position the gripper arms extend outward from the slide 116 as shown in Figs. 7, 8 and 22. The grippers, having drawn a length of covering material into position, the gripper arms on the return movement of the slide are swung to the position shown in Fig. 9, from which position they are again swung outward into operative position before the slide reaches the end of its return movement. For holding the gripper arms in operative and retracted position respectively, a spring bearing arm 130 is preferably provided on the slide 116 to bear against properly formed faces 131 and 132 of the gripper arm 127. For returning the gripper arms to operative position before the slide reaches the end of its return movement a bell-crank lever 135 is mounted on the slide 116 in position to have one arm engage the gripper arm 127 and to have its other arm 136, when the gripper arms are in their retracted position, project to engage a suitable abutment, as 137. As the slide approaches the end of its return movement, the arm 136 engages the abutment 137 and the bell-crank lever is thereby thrown to swing the gripper arms outward from the position shown in Fig. 9 to that shown in Fig. 8. As the slide approaches the end of its return movement, and after the gripper arms have been returned to their outward or operative position as just described, an extended end 140 of the gripper arm 128 is engaged by an inclined abutment 141 by which said extended end of the arm is thrown downward to move the arm against the tension of the spring 129 and raise the gripper 126 away from the gripper 125. This abutment 141 is so positioned and of such size that the gripper 126 will be raised before the edge thereof reaches the vertical plane of the shear blades 101 and 102, and that the end 140 of the gripper arm 128 will pass beyond the same and be released therefrom and allow the gripper 126 to close against the gripper 125 just before the slide 116 reaches the end of its return movement. The end of the covering strip $y$ left projecting from the guide-way 100 after the last operation of the severing shears will thus be clamped between the grippers 125 and 126, and as the slide makes its forward movement, that is to the right in Fig. 8, the covering strip will be drawn through the guide-way 100 and into position to be applied to the folded side sections of the box blank supported by the plungers 41 and 50. The cam abutment 141 is mounted so as to move out of the path of the extended end 140 of the gripper arm 128 as the slide 116 makes its feeding movement, being for this purpose preferably pivotally mounted and held normally in operative position by means of a spring 142 and stop 143. As the grippers approach the end of their feeding movement, the gripper 126 is raised to release the end of the covering strip by means of a cam bar 145 in position to engage the extended end 140 of the gripper arm 128, and to insure the freeing of the end of the covering strip from the gripper 126, means for positively separating the end of the strip from the gripper 126 is provided. For this purpose, preferably, a scraper arm 146 is provided, which, as the grippers approach the end of their feeding movement, is raised by a lever 147 having a cam formed end to engage the under side of a shoulder 148 on the slide 116. When so raised, the scraper arm is in position to enter between the grippers 125 and 126 and to bear against the lower face of the upper gripper 126 and thereby force the end of the covering strip from said gripper as the grippers approach the end of their feeding movement. When the shoulder 148 moves out of engagement with the end of the lever 147 on the return movement of the slide, the scraper arm 146 is allowed to return under the influence of a spring 149 to its normal position, indicated by dotted lines in Fig. 22, leaving a free path for the feeding of the completed boxes from the machine, as hereinafter described.

For holding the end of the covering strip in position to project between the grippers 125 and 126 as the latter move into gripping position at the end of their return movement, supporting and guiding fingers 150 and 151 respectively, are provided extending a short distance beyond the end of the guide-way 100 and slightly beyond the line of the forward edges of the grippers when the latter are in their gripping position, the grippers being recessed, as shown at 152 and 153, to receive such supporting and guiding fingers. As the covering strip is drawn by the grippers into opposition to be applied to the box it is supported by parts of the covering strip applying devices to be described, and as well shown in Fig. 8.

Any suitable mechanism may be employed with other features of the invention for applying the covering strip to the box. Mechanism substantially as shown is preferable, however, and forms in itself a part of the invention. Such mechanism comprises means for raising the middle portion of the strip against the lower horizontal side of the box as the latter is supported by the plungers 41 and 50, means for folding the extending portions of the strip upward against the vertical sides of the box, means for folding the ends of the strip down against the upper horizontal side of the box, means for folding one edge of the strip against the bottom of the box, means for folding the other edge over the edges of the box sides, and means for folding such folded edge inward against the inner faces of the box sides. The means for raising the extending portions of the strip and laying the same against the vertical sides of the box and for folding the ends of the strip down against the upper horizontal side of the box are preferably formed by a pair of folding blocks 160 and 161 lying normally below the path of the strip as the latter is moved into position by the strip positioning devices and moved upward to lay the extending portions of the strip against the vertical sides of the box and then moved horizontally inward to fold the ends of the strip down against the upper horizontal side of the box.

The edge folders for folding the edges of the portions of the covering strip applied to the vertical sides of the box are carried by a yoke or frame 162 carried by a slide 163 mounted to slide vertically in guideways 164 extending through an opening 165 in the table 11. The frame 162 is formed with a horizontal portion 166 from the ends of which extend uprights 167 and 168 leaving an open rectangular space between the uprights and the horizontal portion. This folder carrying frame remains in its lowered position, as shown in Figs. 5 and 7 until a covering strip has been drawn into position thereover and is then raised bodily to the position shown in Figs. 12, 13 and 14, to carry the vertical edge folders upward into operative position. Any suitable means may be provided for raising the slide 163 and folder carrying frame. As shown, the slide is connected to a lever 170 by a link, as shown in Fig. 5, and said lever is oscillated to raise and lower the slide and the folder carrying frame by means of a pitman 171 pivotally connected to said lever and having its other end forked to straddle the cam shaft 35 and provided with a cam roll running in a face cam groove 172 of the cam disk 36 on said shaft. The pitman 171 is preferably adjustably connected to the lever 170 to provide for adjusting the throw of the lever.

The middle portion of the covering strip is raised and pressed against the lower horizontal side of the box by means of a presser bar 175 supported, when the frame 162 is in its lowermost position, by means of rods 176 which extend through openings in the horizontal portion 166 of the frame 162, as shown in Fig. 5. Friction blocks 177 mounted in the ends of the presser bar 175 and spring pressed outward, as shown in Fig. 12, bear against the inner faces of the uprights 167 and 168 of the frame 162 so that as the frame is moved upward the presser bar 175 will be carried upward until the strip lying thereon is brought into contact with the lower horizontal side of the box. The upward movement of the presser bar will then cease, the friction blocks 177 thereafter sliding along the uprights 167 and 168 as the frame 162 continues its upward movement.

The strip folders 160 and 161 are formed by the ends of sliding bars 180 and 181 carried by the upper ends of the uprights 167 and 168 of the folder carrying frame and mounted to slide horizontally thereon, as by being provided with side grooves 182 to receive horizontal guides 183 extending from the inner faces of upward extensions 184 of the uprights 167 and 168. The ends of the bars 180 and 181 which form the folders are provided on each side with inwardly and upwardly extending guide flanges 185, the ends of the bars forming the folders being of a width corresponding to the width of the covering strip and the flanges 185 serving to guide the covering strip as it is drawn into position beneath the box by the positioning devices and during the folding movements of the folders. The extensions 184 of the uprights 167 and 168 are also spaced apart a distance corresponding to the width of the covering strip and serve as positioning guides for the strip as the latter is moved into position beneath the box. When the folder carrying frame is in its lowermost position, as shown in Fig. 5, the top of the sliding bars 180 and 181 and the top of the presser bar 175 form a support to receive the covering strip as the latter is drawn inward over the same by the gripper 115, as will be clearly seen from Figs. 5, 7, and 8. As the folder carrying frame moves upward after the covering strip has been placed in position, the strip will be raised until its middle portion is brought into contact with and pressed against the lower horizontal side of the box by the presser bar 175, and as the upward movement of the folder carrying frame then continues, the extending portions of the strip will be folded upward and laid against the vertical sides of the box by the folders 160 and 161, and when the folder carrying frame reaches its uppermost position the folding bars 180 and 181 will be in line with the upper horizontal side of the box, as shown in Fig. 12. The folding bars are then moved inward to lay the ends of the covering strip down against the upper horizontal side of the box, one of the bars, as 181, first making its inward movement and then being retracted as the other bar 180 makes its inward movement, so that the end of the strip folded by the bar 180 will be lapped over the end folded by the bar 181. The folding bars are given their reciprocating movements in the construction shown by means of actuating levers 186 and 187 which normally stand in the position shown in Figs. 5 and 12 and have their lower ends slotted to receive studs 188 on the folding bars as the folding bars are carried upward by the upward movement of the folder carrying frame. These lever arms are swung inward and outward in proper time to give the folding bars their inward movement and then retract them to their normal position, as shown in full lines in Fig. 12. As shown, these lever arms are carried by rock shafts carrying arms 190 and 191 respectively to which are connected rods 192 and 193 respectively, the rod 192 being connected at its lower end to a lever 194 which carries a cam roll running in the groove of a cam 195 on the cam shaft 46, and the lower end of the rod 193 being connected to a lever 196 which is oscillated by a pitman 197 having a forked end embracing the cam shaft 35 and carrying a cam roll running in the groove of a cam 198 on said shaft.

The edge folders for the edges of the portion of the covering strip applied to the lower horizontal side of the box are formed by plates 200 and 201 mounted on the sides of the presser bar 175 so as to be capable of slight vertical movement thereon, as by means of the pin and slot connection shown, and the plates are normally held in their lower or retracted position, as shown in Fig. 7, by means of springs 202 shown best in Fig. 14. As the folder carrying frame 162 approaches the end of its upward movement, the presser bar 175 being then in the position shown in Figs. 12 and 14, the folder plate 200 is engaged by pins 203 carried by the folder carrying frame 162 and moved upward to the position shown in Fig. 14, thereby folding one edge of the covering strip upward against the bottom of the box, as shown in Figs. 12, 14 and 12$^a$. At the same time, the folding plate 201 is engaged by a spring 204 also carried by the folder carrying frame 162 and moved upward to the position shown in Fig. 14, thereby folding the other edge of the covering strip inward past the edge of the box side as shown in said figure and in Fig. 12$^a$. A yielding part, such as the spring 204, is provided for moving the folding plate 201 upward so as to permit such plate to be moved backward out of the path of the plunger by which the edge of the covering strip is folded inward against the inner faces of the box sides.

Each of the uprights 167 and 168 of the folding frame 162 carries a pair of edge folders for folding the edges of the portions of the covering strip applied to the vertical sides of the box. These folders are preferably formed by the edges of plates 210 and 211, respectively, mounted so as to be capable of horizontal movement on the uprights 167 and 168. Each of the plates 210, as shown, is provided with a pin 214 which projects into position to be engaged by an operating arm 215 by which the plate 210 is given its folding movement against the tension of a spring 216, by which spring it is normally held in its retracted position as shown in Fig. 12. The plates 211 are spring pressed inward, as by means of springs 217 shown in dotted lines in Figs. 12 and 18, and these plates 211 are held normally retracted against the tension of the springs 217 by means of pins 218 carried by the plates 210 and extending through slots in the uprights 167 and 168 and into slots in the plates 211. This construction enables the plates 211 to be moved backward independently of the plates 210 when the plates have made their folding movement to the position shown in Figs. 18 and 19. The purpose of providing for such independent backward movement of the plates 211 is to permit them to be moved back out of the path of the plunger by which the edge of the covering strip is folded inward against the inner faces of the box sides.

The operating levers 215 may be oscillated in any suitable manner. As shown, they are operated by a lever 220 connected to a rod 221 mounted to reciprocate vertically in suitable bearings and the upper end of which rod is connected to the ends of the levers 215 by branching links 222. The lever 220 is oscillated by a cam 223 on the cam shaft 35 through a pitman 224 having a forked end embracing the shaft 35 and carrying a cam roll running in the groove of the cam 223.

Mounted between each pair of folding plates 210 and 211, is a presser plate or bar 225, which presser plates are moved inward at the proper time to press the covering strip against the vertical sides of the box. As shown, such plates are held normally in their retracted position by means of springs 226 mounted on rods 227 extending from the plates 225 through the uprights 167 and 168, and the ends of such rods 227 are in position to be engaged by projections 228 carried by the rods 214, and are of such length that the rods 214 may be moved inward sufficiently to give the folders 210 the movement required for folding the edge of the covering strip against the bottom of the box before the rods 227 are moved by the projections 228 to cause the presser plate 225 to press against the sides of the box, and that, on further inward movement of the rods 214 the rods 227 will be moved inward to carry the presser plates 225 into operative position. The cam 223 is suitably formed, as shown in dotted lines in Fig. 1, to actuate the arms 215 so as to first move the folding plates into the position shown in Figs. 18 and 19 and then to give the rods 214 a further inward movement to operate the presser plates 225. The folding plates 210 are preferably provided with guiding-flanges 229 for the edge of the vertically standing portions of the covering strip.

The edge folders 230 and 231 for folding the edges of the portions of the folding strip applied to the upper horizontal side of the box are preferably carried by a vertically reciprocating support or plunger-head 232 on the lower end of a bar 233 mounted in guide-ways 234 on the frame 12. The support 232 is normally raised to the position shown in Figs. 1, 12 and 13, and after the strip folders 160 and 161 have made their folding movement and returned to the position shown by full lines in Fig. 12, the support is moved downward to the position shown in Fig. 14 to cause the folders 230 and 231 to fold the horizontally extending edges of the covering strip to the position shown in Fig. 14. The folder 231 is yieldingly mounted on the plunger-head so that it may be moved backward out of the path of the plunger by which the edge of the covering strip is folded inward against the inner faces of the box side. For this purpose it is preferably, as shown, secured to the support by a pin and slot connection and pressed downward by a spring 235.

Any suitable means may be provided for reciprocating the support 232. As shown, it is reciprocated by means of a lever 236 having one end connected by a link to the bar 233 and having its other end connected by a link 237 to a lever 238 which is connected by a link 239 to another lever 240 which is oscillated by a cam 241 on the cam shaft 35 through a pitman 242 having a forked end embracing the shaft 35 and provided with a cam roll running in the groove of the cam 241.

In order that the edge folders 200 and 201 and 230 and 231 may act over substantially the whole length of the box sides and not interfere with the vertical folders 210 and 211, such folders are made somewhat shorter than the sides of the box and are provided at each end with yielding extensions 245 formed preferably by pins set into recesses in the ends of the folder plates and spring pressed outward so as to stand normally in the position shown in Figs. 12 and 16. The purpose and operation of these pins will be clear from an inspection of Figs. 16 to 21. As the horizontal edge folders make their folding movements, these pins 245 form practically parts of the folding surfaces making the folders of such length that the horizontal portions of the edges of the covering strip are folded close up to the vertical portions thereof, as shown in Figs. 16, 16ᵃ and 20. The vertical edge folders are then moved inward to the position shown in Figs. 17, 18, 19 and 21, and as such folders move inward the pins 245 are forced backward to the position shown in said last mentioned figures. The portions of the bottom edge of the covering strip are thus evenly folded and laid against the bottom of the box as shown in Fig. 17ᵃ.

For folding the edge of the covering strip inward against the inner faces of the box sides after such edge has been folded by the horizontal and vertical edge folders 201, 211 and 231 to the position shown in Figs. 14, 18 and 19, there is preferably provided a horizontally reciprocating plunger 250 of a size corresponding to the inner dimensions of the box. This folding plunger as shown is carried by a hollow plunger rod or stem 251 mounted to slide on the plunger-rod 42 and within a supporting sleeve 252. As the box forming plunger 41 makes its folding movement through the die opening 40, the plunger 250 moves with it through the die opening to the position shown in Fig. 14, thereby serving to support the sides of the box against the pressure of the presser bars 55 and 56. It then remains stationary in the position shown in Fig. 14, while the plunger 40 continues its movement to carry the box into position to have the covering strip applied thereto and until the covering strip is applied to the box and its edges folded over by the horizontally and vertically moving edge folders. The plunger 250 then continues its forward movement to the position shown in Fig. 15, entering the box and folding the edge of the covering strip inward and against the inner faces of the box sides.

From Figs. 14, 18 and 19, will be seen that the folders 201, 211 and 231 after making their folding movements project into the path of the plunger 250; but these folders are, as already stated, yieldingly mounted, and each one is provided with an inclined cam face 253, and the folding plunger 250 engaging these cam faces forces the folders 201, 211 and 231 backward out of its path as it makes its folding movement to the position shown in Fig. 15.

The plunger 250, as shown, is reciprocated by means of a lever 254 having a double forked upper end to engage pins on the plunger or stem 251, said pins being preferably carried by an adjustable collar 255, and the lower end of the lever 250 carries a cam roll running in the groove of a peripheral cam disk 256 on the cam shaft 46.

The general operation of the machine, briefly stated, is as follows: The plunger 41 being in the position shown in Fig. 7, the blank feeding slide 27 moves upward to raise a blank into position between the plunger 41 and the die opening 40. The plunger 50 then moves forward to clamp the blank against the plunger 41, and the two plungers and the plunger 250 then move backward through the die opening to fold the sides of the box to position at right angles to the bottom section thereof. The movement of the plunger 250 ceases when it reaches the position shown in Fig. 14, while the plungers 41 and 50 continue their movement to carry a box into position to have the covering strip applied thereto, as shown in said figure. As the box is carried beyond the die opening, its lower horizontal side is held in its folded position by the pivoted finger 60 which swings outward with the box to the position shown by dotted lines in Fig. 8, the vertical sides of the box are held in position by the fingers 62, and the upper horizontal side of the box by the finger 70. Before the box is moved into covering position, a covering strip will have been drawn into position by the reciprocating gripper 115, the strip, when in position, being supported by the presser bar 175 and folding plates 200 and 201 and by the sliding bars 180 and 181. The box having then been brought into position to have the covering strip applied thereto, the folder carrying frame 162 begins to rise carrying with it, during the first part of its movement the presser bar 175 until said bar raises the middle portion of the covering strip against the lower horizontal side of the box. The upward movement of the frame 162 then continuing, the extending portions of the covering strip are raised and laid against the vertical sides of the box by the folders 160 and 161, and such upward movement continues until the parts reach the position shown in Fig. 12. After the upward movement of the folder carrying frame commences, the slide 63 is retracted to withdraw the holding fingers 62 out of the path of the uprights of the folder carrying frame and is then returned to carry the holding finger 70 back into position over the upper horizontal side of the box. On this second advance of the slide 63, the holding fingers 62 will engage the uprights of the folder frame or parts carried thereby and will swing backward as the slide 63 advances, (see Fig. 13). As the folder carrying frame makes its upward movement, an inclined face 260 on one of the guiding flanges 185 of the folder 160 engages the holding finger 60 and swings it back into its normal position (see Figs. 7 and 8). Just before the folder carrying frame reaches the end of its upward movement, the folder plates 200 and 201 are raised by the rods 203 and springs 204 respectively to the position shown in Fig. 14, thereby folding upward the edges of the portion of the covering strip applied to the lower horizontal side of the box. The raising of the folder plate 200 also causes the presser bar 175 to be pressed upward by the springs 202 to press the covering strip against the side of the box. After the folder carrying frame reaches the position shown in Fig. 12, the slide 63 is again moved backward to retract the holding finger 70, and the folders 160 and 161 are moved inward to fold and overlap the ends of the covering strip on the upper horizontal side of the box and quickly retracted again to the position shown in Fig. 12. The support 232 is then moved downward to carry the folders 230 and 231 to the position shown in Fig. 14, thereby folding the upper horizontal edges of the covering strip downward. The parts then being in the position shown in Figs. 14 and 16, the operating levers 215 are moved inward to give the folding plates 210 and 211 their folding movements to the position shown in Figs. 17, 18 and 19, thus completing the folding of one edge of the covering strip against the bottom of the box, as shown in Fig. 17ª, and bringing the other edge into position to be folded inward by the folding plunger 250. The folding plunger 250 then makes its folding movement from the position shown in Fig. 14 to that shown in Fig. 15, thereby folding the edge of the covering strip inward against the inner faces of the box sides. After the folding plunger has entered the box the operating levers 215 are given a slight further movement to force the presser plates 225 inward to press the covering strip against the vertical sides of the box, and at the same time the lever 236 is given a slight further movement to force the plunger head 232 down to press the covering strip against the upper horizontal side of the box, and the folder carrying frame is raised slightly to force the presser bar 175 up to resist the downward pressure of the plunger head 232 and to press the covering strip against the lower horizontal side of the box. By the inward movements of the presser bars to press the covering strip against the sides of the box after the folding plunger 250 has entered the box, the inwardly folded edges of the covering strip are also pressed against the inner faces of the box sides. The movement of the folding plunger 250 is sufficient to carry it into engagement with the plunger 41, as shown in Fig. 15, and to force the plunger 41 and the box slightly backward against the horizontal folding plates 200 and 230 and the vertical folding plates 210 and to press the folded edge of the covering material against the bottom of the box. Pressure for setting the covering strip in position is thus brought against every portion of the strip after it is applied to the box. The covering of the box being thus completed, the levers 215 are moved outward to allow the folding plates 210 and 211 and the presser plates 225 to return to their normal positions, and the plungers 41 and 250 are returned to the positions shown in Fig. 7. The folder carrying frame 162 is then lowered and the plunger 50 retracted to the position shown in said figure. While the covering operations have been going on the strip gripper 115 has been returned to grip the end of another covering strip. The slide 116 which carries the gripper does not make its return movement until the folder carrying frame is moved up into the path of the gripper, and as the slide makes such return movement the gripper carrying arms 127 and 128 engage the upright 168 of the folder carrying frame and are swung back to the position shown in Fig. 9, so as to clear the folder carrying frame and parts carried thereby as the slide 116 continues its return movement. After the slide has passed the folder carrying frame on such return movement, the arm 136 of the lever 135 engages the abutment 137 and the lever 135 is thereby thrown to swing the gripper arms 127 and 128 outward again into operative position. The gripper jaws then seize the end of the covering strip extending from the guide-way 100 as hereinbefore explained, and the slide 116 makes its forward or positioning movement to carry another length of covering material into position to be applied to a box. The box covering parts having meanwhile returned to the position shown in Fig. 7, the box which has just been covered is as the slide 116 makes its forward movement engaged by an ejecting device carried by the slide 116 and formed preferably by a pair of upwardly extending pushing fingers 265 carried by the gripper jaw 126, (see Figs. 7, 8 and 22,) and by which pushing fingers the completed box is pushed along the top of the folding bar 181 edgewise from the covering position and transversely of the direction of its movement into covering position. The completed box will thus be delivered from the covering devices as a covering strip for the next box is moved into position. Any suitable means may be provided for receiving the completed boxes as they are fed from the machine.

It will be understoood that the invention is not to be limited to the exact construction and arrangement of parts as shown and to which the foregoing description has been mainly confined, but that the invention includes various changes and modifications thereof within the claims. It will be understood also that parts of the invention may be employed independently of other parts thereof, or in combination with other coöperating parts.

What is claimed is:—

1. The combination of a forming plunger, side folders past which a box blank is carried by said plunger, and means for applying covering material to the box while the box is stationarily supported by the plunger, substantially as described.

2. The combination of a forming plunger, side folders past which a box blank is carried by said plunger, means for applying covering material to the box while the box is stationarily supported by the plunger, and means for delivering the covered boxes transversely to the direction of movement of the plunger, substantially as described.

3. The combination of a forming plunger, side folders past which a box blank is carried by said plunger, and means for applying a strip of covering material to the sides of the box while the box is stationarily supported by the plunger, substantially as described.

4. The combination of a forming plunger, side folders past which a box blank is carried by said plunger, means for moving a strip of covering material into position to be applied to the sides of the box, and means for folding such strip about the sides of the box while the box is stationarily supported by the plunger, substantially as described.

5. The combination of a forming plunger, side folders past which a box blank is carried by said plunger, means for applying an intermediate portion of a strip of covering material to one side of the box, and means for folding the extending portions of the strip about the remaining sides of the box while the box is stationarily supported by the plunger, substantially as described.

6. The combination of a forming plunger, side folders past which a box blank is carried by said plunger, means for feeding a strip of covering material lengthwise into position to be applied to the box, means for pressing a portion of the strip against a side of the box, and means for folding the remainder of the strip about the sides of the box while the box is stationarily supported by the plunger, substantially as described.

7. The combination of a forming plunger, side folders past which a box blank is carried by said plunger, a reciprocating gripper for drawing a strip of covering material lengthwise into position to be applied to the box, means for pressing a portion of the strip against a side of the box, and means for folding the remainder of the strip about the sides of the box while the box is stationarily supported by the plunger, substantially as described.

8. The combination of a forming plunger, side folders past which a box blank is carried by said plunger, means for feeding a strip of covering material lengthwise into position to be applied to the box, means for pressing a portion of the strip against a side of the box, means for folding the remainder of the strip about the sides of the box while the box is stationarily supported by the plunger, and means for delivering the covered boxes transversely to the direction of movement of the plunger, substantially as described.

9. The combination of a forming plunger, side folders past which a box blank is carried by said plunger, means for feeding a strip of covering material lengthwise into position to be applied to the box, means for folding the strip about the sides of the box, and a member moving with the strip-feeding means for delivering the covered boxes, substantially as described.

10. The combination of a forming plunger, side folders past which a box blank is carried by said plunger, a reciprocating gripper for drawing a strip of covering material lengthwise into position to be applied to the box, means for pressing a portion of the strip of material against a side of the box, means for folding the remainder of the strip about the sides of the box, and a part carried by the gripper for delivering the covered boxes, substantially as described.

11. The combination of a forming plunger, side folders past which a box blank is carried by said plunger, means for feeding a strip of covering material into position to be applied to the box, means for pressing an intermediate portion of such strip against a side of the box, and means for folding the extending portions of the strip about the remaining sides of the box, substantially as described.

12. The combination of a forming plunger, side folders past which a box blank is carried by said plunger, means for applying covering material to the box, and means for folding the edge of the covering material over the edges of the box sides and inward against the inner faces of the box sides while the box is supported by the plunger, substantially as described.

13. The combination of a forming plunger, side folders past which a box blank is carried by said plunger, means for applying covering material to the box, means for folding the edge of the covering material over the edges of the box sides and inward against the inner faces of the box sides while the box is supported by the plunger, and means for delivering the covered boxes transversely to the direction of movement of the plunger, substantially as described.

14. The combination of a forming plunger, side folders past which a box blank is carried by said plunger, means for applying covering material to the box while the box is stationarily supported by the plunger, and means for folding the edge of the covering material over the edges of the box sides and inward against the inner faces of the box sides while the plunger is in the position in which the covering material is applied to the box, substantially as described.

15. The combination of a forming plunger, side folders past which a box blank is carried by said plunger, means for applying a strip of covering material to the sides of the box, and means for folding one edge of the strip against the bottom of the box and the other edge of the strip over the edges of the box sides and inward against the inner faces of the box sides while the box is supported by the plunger, substantially as described.

16. The combination of a forming plunger, side folders past which a box blank is carried by said plunger, means for feeding a strip of covering material lengthwise into position to be applied to the box, means for pressing a portion of the strip against a side of the box, means for folding the remainder of the strip about the sides of the box, and means for folding one edge of the strip against the bottom of the box and the other edge of the strip over the edges of the box sides and inward against the inner faces of the box sides while the box is supported by the plunger, substantially as described.

17. The combination of a forming plunger, side folders past which a box blank is carried by said plunger, means for feeding a strip of covering material into position to be applied to the box, means for pressing an intermediate portion of the strip against a side of the box, means for folding the extending portions of the strip about the remaining sides of the box, and means for folding one edge of the strip over the edges of the box sides and inward against the inner faces of the box sides, substantially as described.

18. The combination of a forming plunger, side folders past which a box blank is carried by said plunger, means for applying a strip of covering material to the sides of the box, and means for folding one edge of the strip against the bottom of the box and the other edge of the strip over the edges of the box sides and inward against the inner faces of the box sides while the plunger is in the position in which the strip of covering material is applied to the box sides, substantially as described.

19. The combination of a forming plunger, side folders past which a box blank is carried by said plunger, means for applying an intermediate portion of a strip of covering material to one side of the box, means for folding the extending portions of the strip about the remaining sides of the box, and means for folding one edge of the strip over the edges of the box sides and inward against the inner faces of the box sides while the box is supported by said plunger, substantially as described.

20. The combination of a forming plunger, side folders past which a box blank is carried by said plunger, means for feeding a strip of covering material lengthwise into position to be applied to the box, means for pressing a portion of the strip to a side of the box, means for folding the remainder of the strip about the sides of the box while the box is stationarily supported by the plunger, and means for folding one edge of the strip against the bottom of the box and the other edge of the strip over the edges of the box sides and inward against the inner faces of the box sides while the box is supported by said plunger, substantially as described.

21. The combination of a forming plunger, side folders past which a box blank is carried by said plunger, a gripper for drawing a strip of covering material lengthwise into position beneath the box, means for applying the strip of covering material to the sides of the box, means for folding one edge of the strip over the edges of the box sides and inward against the inner faces of the box sides while the box is supported by said plunger, and an ejector moving with said gripper for delivering the covered boxes, substantially as described.

22. The combination of a forming plunger, a supporting plunger adapted to clamp a box blank against the forming plunger, side folders past which the box blank is carried by said plungers, means for applying covering material to the box sides, and means for folding one edge of the covering material against the bottom of the box and the other edge over the edges of the box sides and inward against the inner faces of the box sides while the box is supported by said plungers, substantially as described.

23. The combination of a former, means for clamping a box blank against the former, side folders for folding the sides of the box blank while supported by the former, means for applying covering material to the sides of the box while the box is stationarily supported by the former, means for folding the edge of the covering material over the edges of the box sides, and a folding plunger for folding such edges of the covering material inward and against the inner faces of the box sides while the box is supported by the former, substantially as described.

24. The combination of a former, means for clamping a box blank against the former, side folders for folding the sides of the box blank while supported by the former, means for applying covering material to the sides of the box while the box is stationarily supported by the former, and means for folding the edge of the covering material over the edges of the box sides and inward against the inner faces of the box sides while the box is supported by the former, substantially as described.

25. The combination of a former, means for clamping a box blank against the former, side folders for folding the sides of the box blank while supported by the former, means for applying covering material to the sides of the box while the box is stationarily supported by the former, and means for folding the edge of the covering material over the edges of the box sides and inward against the inner faces of the box sides, substantially as described.

26. The combination of a former, means for clamping a box blank against the former, side folders for folding the sides of the box while supported by the former, and means for applying covering material to the sides of the box while the box is stationarily supported by the former, substantially as described.

27. The combination of supporting members for engaging opposite sides of the bottom section of a box, means for applying a strip of covering material to the sides of the box while supported by said members, means for folding the edge of the covering material over the edges of the box sides, and a folding plunger for folding such edge of the covering material inward and against the inner faces of the box sides while the box is supported by said members, substantially as described.

28. The combination of a forming plunger, side folders past which a box blank is carried by said plunger, means for applying a strip of covering material to the sides of the box, means for bending the edge of the covering material over the edges of the box sides, and a folding plunger for folding such edge of the covering material inward and against the inner faces of the box sides while the box is supported by the forming plunger, substantially as described.

29. The combination of a forming plunger, a die opening, means for moving the plunger to carry a box blank through the die opening and for maintaining the plunger stationary while covering material is applied to the box, and means for applying covering material to the box, substantially as described.

30. The combination of a forming plunger, a die opening through which a box blank is carried by said plunger, said die opening having yielding presser bars 55 and 56 means for applying covering material to the box sides, a folding plunger, means for moving the folding plunger with the forming plunger through the die opening to support the box sides against the pressure of the bars 55 and 56 and for interrupting the forward movement of the folding plunger while the forming plunger continues its movement to carry the box into position to have the covering material applied thereto and for giving the folding plunger a further movement to fold the edges of the covering material inward against the inner faces of the box sides while the box is supported by the forming plunger, substantially as described.

31. The combination of a forming plunger, side folders past which a box blank is carried by said plunger, means for applying covering material to the box sides and for bending the edge of the covering material over the edges of the box sides, a folding plunger, and means for moving the folding plunger with the forming plunger past said side folders and for interrupting the forward movement of the folding plunger while the movement of the forming plunger continues and for giving the folding plunger a further movement to fold the edge of the covering material inward against the inner faces of the box sides while the box is supported by the forming plunger, substantially as described.

32. The combination of means for moving a box into position to have covering material applied thereto and for stationarily supporting the box in such position, covering devices for applying covering material to the box while stationarily supported in such position, and means for delivering the covered box from such position transversely to the direction of its movement into such position, substantially as described.

33. The combination of means for moving a box into position to have covering material applied to the sides of the box, covering devices for applying an intermediate portion of a strip of covering material to a side of the box and for holding the extending portions of the strip about the remaining sides of the box, and means for delivering the covered box from the covering devices transversely to the direction of its movement into covering position, substantially as described.

34. The combination of means for moving a box into position to have covering material applied to the sides of the box, a gripper for drawing a strip of covering material lengthwise into position to be applied to the box, means for folding the strip about the sides of the box, and an ejector moving with the gripper for delivering the box from the covering devices transversely to the direction of its movement into covering position, substantially as described.

35. The combination of means for moving a box into position to have covering material applied to the sides of the box, covering devices including means for applying a strip of covering material to the box sides and means for folding the edge of the covering material over the edges of the box sides and inward against the inner faces of the box sides, and an ejector for delivering the box from the covering devices transversely of the direction of its movement into covering position, substantially as described.

36. The combination of means for moving a box flatwise of the box bottom into position to have covering material applied to the box, covering devices for applying a strip of covering material to the sides of the box, and means for delivering the box from the covering devices edgewise of the box bottom from the position in which the covering material is applied to the box, substantially as described.

37. The combination of means for stationarily supporting a box in position to have covering material applied to the sides of the box, means for feeding a strip of covering material into position to be applied to the box, means for pressing a portion of the strip against a side of the box, and means for folding the remainder of the strip against the sides of the box while the box is stationarily supported, substantially as described.

38. The combination of means for supporting a box in position to have covering material applied to the sides of the box, a gripper for drawing a strip of covering material lengthwise into position to be applied to the box, means for pressing an intermediate portion of such strip against a side of the box, and means for folding the extending portions of the strip about the remaining sides of the box, substantially as described.

39. The combination of means for supporting a box in position to have covering material applied to the sides of the box, a gripper for drawing a strip of covering material lengthwise into position to be applied to the box, means for pressing an intermediate portion of such strip against a side of the box, means for folding the extending portions of the strip about the remaining sides of the box, and an ejector moving with the gripper, substantially as described.

40. The combination of means for supporting a box in position to have covering material applied to the sides of the box, a gripper for drawing a strip of covering material into position to be applied to the box sides, means for applying the strip to the box sides, and an ejector moving with said gripper, substantially as described.

41. The combination of means for supporting a box in position to have covering material applied to the sides of the box, means for applying covering material to the sides of the box while the box is stationarily supported, and means for moving the box from the covering position edgewise of the box bottom, substantially as described.

42. The combination of means for supporting a box in position to have covering material applied to the sides of the box, means for applying covering material to the sides of the box while the box is stationarily supported, and means for folding the edge of the covering material over the edge of the box sides and inward against the inner faces of the box sides, substantially as described.

43. The combination of means for supporting a box in position to have covering material applied to the sides of the box, means for applying covering material to the box sides, and means for folding the edge of the covering material over the edges of the box sides and inward against the inner faces of the box sides while the box is in the position in which the covering material was applied to the box sides, substantially as described.

44. The combination of means for supporting a box in position to have covering material applied to the sides of the box, means for folding a strip of covering material about the sides of the box, means for folding one edge of the strip against the bottom of the box and for folding the other edge of the strip over the edges of the box sides and inward against the inner faces of the box sides while the box is in the position in which the strip was applied to the box sides, substantially as described.

45. The combination of means for supporting a box in position to have covering material applied to the sides of the box, means for folding a strip of covering material about the sides of the box, means for simultaneously folding one edge of the strip against the bottom of the box and the other edge of the strip over the edges of the box sides, and means for folding the last mentioned edge of the strip inward against the inner faces of the box sides, substantially as described.

46. The combination of a forming plunger, side folders past which a box blank is carried by said plunger, holding devices for holding the sides of the box in their folded position after the plunger advances beyond said side folders, covering devices for applying covering material to the sides of the box, and means for moving said holding devices away from the sides of the box before the covering material is applied thereto, substantially as described.

47. The combination of a former, side folders, means for causing a movement of one of said members to fold the side sections of a box blank about the said former, holding devices for holding the sides of the box in their folded position after they have been folded by said side folders, covering devices for applying covering material to the sides of the box, and means for moving said holding devices away from the sides of the box before the covering material is applied thereto, substantially as described.

48. The combination of a forming plunger, side folders past which a box blank is carried by said plunger, a pivoted holding finger 60 for holding one of the sides of the box in its folded position after the plunger advances beyond said folders, covering devices for applying covering material to the sides of the box, and means for swinging the finger 60 away from the side of the box to allow the covering material to be applied thereto, substantially as described.

49. The combination of a forming plunger, a die opening through which a box blank is carried by said plunger to fold the side sections of the blank, the walls of said die opening being provided with yielding presser bars 55 and 56, and means for applying covering material to the sides of the box after the plunger has moved beyond said die opening, substantially as described.

50. The combination of a forming plunger, a die opening through which a box blank is carried by said plunger to fold the side sections of the blank, the walls of said die opening being provided with yielding presser bars 55 and 56, the presser bars of adjacent sides of the die opening being arranged in different planes, and means for applying covering material to the sides of the box after the plunger has moved beyond said die opening, substantially as described.

51. The combination of a forming plunger, side folders past which a box blank is carried by said plunger, means for pressing an intermediate portion of a strip of covering material against the lower horizontal side of the box, a pair of strip folders for folding the extending portions of the strip about the remaining sides of the box, and means for causing said strip folders to move first upward parallel with the vertical sides of the box and then inward parallel with the upper horizontal sides of the box, substantially as described.

52. The combination of means for supporting a box in position to have covering material applied to the sides of the box, means for feeding a strip of covering material into position to be applied to the box, means for pressing an intermediate portion of the strip against the lower horizontal side of the box, a pair of strip folders for folding the extending portions of the strip about the remaining sides of the box, and means for causing said strip folders to move first upward parallel with the vertical sides of the box and then inward parallel with the upper horizontal side of the box, substantially as described.

53. The combination of means for supporting a box in position to have covering material applied to the sides thereof, means for pressing an intermediate portion of a strip of covering material against one side of the box, a pair of strip folders for folding the extending portions of the strip about the remaining sides of the box, and means for giving each of said folders folding movements in a plurality of directions corresponding to the sides of the box to which the extending portions of the strip are applied, substantially as described.

54. The combination of means for supporting a box in position to have covering material applied to the sides thereof, and means for folding a strip of covering material about the sides of the box including a strip folder operated to have folding movements in a plurality of directions corresponding to the sides of the box to which the strip is applied by said folder, substantially as described.

55. The combination of means for supporting a box in position to have covering material applied to the sides thereof, and covering devices for folding a strip of covering material about the sides of the box including a plurality of strip folders and means for moving each of said folders in a plurality of directions corresponding to the sides of the box to which the strip is applied thereby, substantially as described.

56. The combination of means for supporting a box in position to have covering material applied to the sides thereof, means for pressing an intermediate portion of a strip of covering material against the lower horizontal side of the box, a pair of strip folders for folding the extending portions of the strip about the remaining sides of the box, guide flanges 185 on said strip folders, and means for causing said strip folders to move first upward parallel with the vertical sides of the box and then inward parallel with the upper horizontal side of the box, substantially as described.

57. The combination of means for supporting a box in position to have covering material applied thereto, means for folding a strip of material about the sides of the box including a strip folder operated to have folding movements in a plurality of directions corresponding to the sides of the box to which the strip is applied by said folder, and guide flanges 185 on said strip folder, substantially as described.

58. The combination of means for supporting a box in position to have covering material applied to the sides thereof, covering devices, means for delivering the covered boxes edgewise of the bottom of the box from the covering position, and means for moving the covering devices out of the path of the delivery movement of the covered boxes, substantially as described.

59. The combination of means for supporting a box in position to have covering material applied to the sides thereof, covering devices including means for folding a strip of covering material about the sides of the box and for folding one edge of the strip against the bottom of the box and the other edge of the strip over the edges of the sides of the box and inward against the inner faces of the box sides, means for delivering the covered boxes edgewise of the bottom of the box from the covering position, and means for moving the covering devices out of the path of the delivery movement of the covered boxes, substantially as described.

60. The combination of means for stationarily supporting a box in position to have covering material applied to the sides thereof, covering devices for applying covering material to the sides of the box, means for causing a relative movement between the supporting means and the covering devices to bring the same into proper relative positions for the covering operation and a return relative movement after the covering operation, means for operating the covering devices to apply the covering material while the box is stationarily supported, and means for delivering the covered boxes edgewise of the bottom of the box from the covering devices after said return movement, substantially as described.

61. The combination of means for stationarily supporting a box in position to have covering material applied to the sides thereof, covering devices for applying covering material to the sides of the box, means for causing a relative movement in a direction edgewise of the bottom of the box between the supporting means and the covering devices to bring the same into proper relative positions for the covering operation and a return relative movement after the covering operation, means for operating the covering devices to apply a covering material to the box while the box is stationarily supported and means for delivering the covered boxes edgewise of the bottom of the box from the covering position after said return movement, substantially as described.

62. The combination of means for stationarily supporting a box in position to have covering material applied to the sides thereof, covering devices for applying covering material to the sides of the box, means for causing a relative movement in a direction edgewise of the bottom of the box between the supporting means and the covering devices to bring the same into proper relative positions for the covering operation and a return relative movement after the covering operation, and means for operating the covering devices to apply a covering material to the box while the box is stationarily supported substantially as described.

63. The combination of means for stationarily supporting a box in position to have covering material applied to the sides thereof, covering devices for applying covering material to the sides of the box, means for feeding a strip of covering material into position to be applied to the box by the covering devices, means for causing a relative movement in a direction edgewise of the bottom of the box between the supporting means and the covering devices to bring the same into proper relative positions for the covering operation and a return relative movement after the covering operation, and means for operating the covering devices to apply a covering material to the box while the box is stationarily supported substantially as described.

64. The combination of means for moving a box flatwise of the bottom of the box into position to have covering material applied to the sides thereof and for stationarily supporting the box in such position, covering devices for applying covering material to the sides of the box, means for causing a relative movement in a direction edgewise of the bottom of the box between the box supporting means and the covering devices to bring the same into proper relative positions for the covering operation and a return relative movement after the covering operation, and means for operating the covering devices to apply a covering material to the box while the box is stationarily supported substantially as described.

65. The combination of means for moving a box flatwise of the bottom of the box into position to have covering material applied to the sides thereof and for stationarily supporting the box in such position, covering devices for applying covering material to the sides of the box, means for moving the covering devices in a direction edgewise of the bottom of the box into position for the covering operation and for returning the same after the covering operation, and means for operating the covering devices to apply a covering material to the box while the box is stationarily supported substantially as described.

66. The combination of means for moving a box into position to have covering material applied to the sides thereof and for stationarily supporting the box in such position, covering devices for applying covering material to the sides of the box, means for causing a relative movement in a direction edgewise of the bottom of the box between the box supporting means and the covering devices to bring the same into proper positions for the covering operation and a return relative movement after the covering operation, means for operating the covering devices to apply covering material to the box while the box is stationarily supported and means for delivering the covered boxes after said return movement, substantially as described.

67. The combination of means for moving a box into position to have covering material applied to the sides thereof and for stationarily supporting the box in such position, covering devices for applying covering material to the sides of the box, means for moving the covering devices into position for the covering operation and for returning the same after the covering operation, means for operating the covering devices to apply a covering material to the box while the box is stationarily supported and means for delivering the covered boxes after said return movement, substantially as described.

68. The combination of means for stationarily supporting a box in position to have covering material applied to the sides thereof, covering devices for applying a strip of covering material to the sides of the box, means for moving one of said members to bring the same into proper position with relation to the other of said members for the covering operation and for returning said member after the covering operation, means for operating the covering devices to apply a strip of covering material to the sides of the box while the box is stationarily supported, means for feeding a strip of covering material into position to be applied to the sides of the box before the movement of said member into position for the covering operation, and means for delivering the covered boxes after said return movement, substantially as described.

69. The combination of means for stationarily supporting a box in position to have covering material applied to the sides thereof, covering devices for applying a strip of covering material to the sides of the box, means for moving the covering devices into position for the covering operation and for returning the same after the covering operation, means for operating the covering devices to apply the strip of covering material to the sides of the box while the box is stationarily supported, means for feeding a strip of covering material into position to be applied to the box sides before the covering devices are moved into position for the covering operation, and means for delivering the covered boxes after said return movement of the covering devices, substantially as described.

70. The combination of means for supporting a box in position to have covering material applied to the sides thereof, means for pressing an intermediate portion of a strip of covering material against one side of the box, edge folders for folding the edges of the portions of the strip applied to the sides of the box adjacent to said side, means for moving said edge folders into operative position lengthwise of said adjacent sides of the box and for returning said folders after the folding operation, means for operating said folders when in operative position, strip folders moving with said edge folders to lay the extending portions of the strip against said adjacent sides of the box, and means for moving said strip folders to lay the ends of the strip against the remaining side of the box, substantially as described.

71. The combination of means for supporting a box in position to have covering material applied to the sides thereof, folder supports, strip folders on said supports for folding a strip of covering material about the sides of the box, means for moving said supports to cause the strip folders to fold the strip against opposite sides of the box, means for moving said strip folders to fold and lay the ends of the strip, edge folders carried by said supports and carried into operative position by the movement of said supports, means for actuating said edge folders, and means for folding the edges of the portions of the strip applied to the remaining sides of the box, substantially as described.

72. The combination of means for supporting a box in position to have covering material applied to the sides thereof, folder supports, strip folders on said supports for folding a strip of covering material about the sides of the box, means for causing a relative movement between said box supporting means and said folder supports to cause the strip folders to fold the strip against opposite sides of the box, means for moving said strip folders to fold and lay the ends of the strip, edge folders carried by said folder supports and carried into operative position by the movement of said supports, means for actuating said edge folders, and means for folding the edges of the portions of the strip applied to the remaining sides of the box, substantially as described.

73. The combination of means for supporting a box in position to have covering material applied to the sides thereof, folder supports, strip folders mounted to slide on said supports for folding a strip of covering material about the sides of the box, means for moving said supports to cause the strip folders to fold the strip against opposite sides of the box, means for sliding said strip folders to fold and lay the ends of the strip, edge folders carried by said supports and carried into operative position by the movement of said supports, means for actuating said edge folders, and means for folding the edges of the portions of the strip applied to the remaining sides of the box, substantially as described.

74. The combination of means for supporting a box in position to have covering material applied to the sides thereof, folder supports, strip folders on said supports for folding a strip of covering material about the sides of the box, means for moving said supports to cause the strip folders to fold the strip against opposite sides of the box, means for moving the said strip folders to fold and lay the ends of the strip, presser bars and edge folders carried by said supports and carried into operative position by the movement of said supports, means for actuating said presser bars and edge folders, and means for folding the edges of the portions of the strip applied to the remaining sides of the box, substantially as described.

75. The combination of means for supporting a box in position to have covering material applied to the sides thereof, folder supports, strip folders on said supports, a presser bar, means for feeding a strip of covering material into position over said strip folders and presser bar, means for raising said presser bar to carry an intermediate portion of the strip against the lower horizontal side of the box and for moving said supports to cause the strip folders to fold the strip against the vertical sides of the box, means for moving said strip folders to fold the ends of the strip against the upper horizontal side of the box, edge folders carried by said supports and carried into operative position by the movement of said supports, means for actuating said edge folders, and means for folding the edges of the portions of the strip applied to the horizontal sides of the box, substantially as described.

76. The combination of means for moving a box flatwise of the bottom of the box into position to have covering material applied to the side thereof and for supporting the box in such position, folder supports, strip folders on said supports, a presser bar, means for feeding a strip of covering material into position over said strip folders and presser bar, means for raising said presser bar to carry an intermediate portion of the strip against the lower horizontal side of the box and for moving said supports to cause the strip folders to fold the strip against the vertical sides of the box, means for moving said strip folders to fold the ends of the strip against the upper horizontal side of the box, edge folders carried by said supports and carried into operative position by the movement of said supports, means for actuating said edge folders, and means for folding the edges of the portions of the strip applied to the horizontal sides of the box, substantially as described.

77. The combination of means for supporting a box in position to have covering material applied to the sides thereof, a vertical reciprocating frame 162, means for feeding a strip of covering material into position to be folded about the sides of the box, strip folders carried by said frame in position to fold the strip upward against the vertical sides of the box as the frame moves upward, means for moving said strip folders to fold the ends of the strip against the upper horizontal side of the box, edge folders for folding the edges of the portions of the strip applied to the horizontal sides of the box, and edge folders carried by said frame for folding the edges of the portions of the strip applied to the vertical sides of the box, substantially as described.

78. The combination of means for supporting a box in position to have covering material applied to the sides thereof, a vertically reciprocating frame 162, means for feeding a strip of covering material into position to be folded about the sides of the box, strip folders carried by said frame in position to fold the strip upward against the vertical sides of the box as the frame moves upward, means for moving said strip folders to fold the ends of the strip against the upper horizontal side of the box, edge folders for folding the edges of the portions of the strip applied to the horizontal sides of the box, edge folders carried by said frame for folding the edges of the portions of the strip applied to the vertical sides of the box, and means for delivering the covered boxes after the folder carrying frame has moved downward, substantially as described.

79. The combination of means for supporting a box in position to have covering material applied to the sides thereof, covering devices, a reciprocating support, a gripper carried by said support for feeding a strip of covering material into position to be folded about the sides of the box by the covering devices, means for moving the covering devices into position for the covering operation, and for returning the same after the covering operation, and means for shifting the gripper to move clear of the covering devices on the return movement of said reciprocating support, substantially as described.

80. The combination of means for supporting a box in position to have covering material applied to the sides thereof, covering devices, a reciprocating support, a gripper carried by said support for feeding a strip of covering material into position to be folded about the sides of the box by said covering devices, means for causing a relative movement between the box supporting means and the covering devices to bring the same into proper relative positions for the covering operation and a return relative movement after the covering operation, an ejector carried by said reciprocating support for delivering the covered boxes, and means for shifting the gripper and the ejector on the return movement of the reciprocating support, substantially as described.

81. The combination of means for supporting a box in position to have covering material applied to the sides thereof, covering devices, a reciprocating gripper for feeding a strip of covering material into position to be folded about the sides of the box by the covering devices, means for causing a relative movement between the box supporting means and the covering devices to bring the same into proper relative positions for the covering operation and a return relative movement after the covering operation, and means for causing the gripper to move during its return movement in a path other than the path of its feeding movement, substantially as described.

82. The combination with means for folding a strip of covering material about the sides of a box, of a gripper for feeding the strip of covering material into position to be applied to the box, means for delivering the covered boxes, a scraper for freeing the end of the covering strip from the gripper, and means for moving said scraper into position to enter between the gripping members of the gripper and for returning the scraper to a position out of the path of the delivery movement of the covered boxes, substantially as described.

83. The combination with covering devices comprising means for folding a strip of covering material about the sides of a box, of means for feeding the strip of covering material into position to be applied to the box, said feeding means comprising a reciprocating support, a gripper carried by said support, means for actuating said gripper to seize the end of the covering strip and to release the strip after the support has made its feeding movement, and means for moving the gripper on the support to clear the covering devices on the return movement of the support, substantially as described.

84. The combination with covering devices comprising means for folding a strip of covering material about the sides of a box, of means for feeding the strip of covering material into position to be applied to the box, said means comprising a reciprocating slide, a gripper arm pivotally mounted on said slide, a second gripper arm pivotally mounted on the first mentioned gripper arm, gripper jaws carried by said gripper arms, means for actuating said second gripper arm to cause the jaws to seize the end of the strip and to release the same after the slide has made its feeding movement, and means for swinging the first mentioned gripper arm on its pivot to carry the gripper jaws clear of the covering devices on the return movement of the slide, substantially as described.

85. The combination of means for supporting a box by engagement with the bottom thereof, means for applying covering material to the sides of the box, means for folding the edge of the covering material over the edges of the box sides, a folding plunger for folding such edge of the covering material inward against the inner faces of the box sides, presser bars, and means for actuating the presser bars after the folding plunger has entered the box to press the covering material against the sides of the box, substantially as described.

86. The combination of means for supporting a box by engagement with the bottom thereof, means for applying covering material to the sides of the box, means for folding the edge of the covering material over the edges of the box sides, a folding plunger for folding such edge of the covering material inward against the inner faces of the box sides, and means for pressing the covering material against the sides of the box after the folding plunger has entered the box, substantially as described.

87. The combination of means for supporting a box, means for applying covering material to a side of the box, means for folding the edge of the covering material over the edge of said box side, a folding device for folding such edge of the covering material inward against the inner face of said box side, and means for pressing the folding material against the side of the box while the latter is supported by said folding device, substantially as described.

88. The combination of means for supporting a box by engagement with the bottom thereof, means for applying covering material to the sides of the box, edge folders for folding one edge of the covering material against the bottom of the box, means for folding the other edge of the covering material over the edges of the box sides, a folding plunger for folding the last mentioned edge of the covering material inward against the inner faces of the box sides and for forcing the bottom of the box against said edge folders, and means for pressing the covering material against the sides of the box after the folding plunger has entered the box, substantially as described.

89. The combination of means for applying covering material to the sides of a box, means for folding one edge of the covering material against the bottom of the box and the other edge of the covering material over the edges of the box sides and inward against the inner faces of the box sides, and means for pressing the edge portions of the covering material against the bottom of the box and the inner faces of the box sides, substantially as described.

90. The combination with means for applying covering material to adjacent sides of a box, of an edge folder for folding the edge of the covering material applied to one of said box sides and for holding the same in its folded position while the edge of the material applied to the adjacent box side is folded, a folder for folding the edge of the material applied to said adjacent side of the box, said folders being formed to extend substantially to the ends of the box sides and the first mentioned folder having a part arranged to retreat as the second folder makes its folding movement, substantially as described.

91. The combination with means for applying covering material to adjacent sides of a box, of an edge folder for folding the edge of the covering material applied to one of said box sides against the bottom of the box and for holding the same in its folded position while the edge of the material applied to the adjacent box side is folded, a folder for folding the edge of the material applied to said adjacent side of the box against the bottom of the box, said folders being formed to extend substantially to the ends of the box sides and the first mentioned folder having a part arranged to retreat as the second folder makes its folding movement, substantially as described.

92. The combination with means for applying covering material to adjacent sides of a box, of an edge folder for folding the edge of the covering material applied to one of said box sides over the edge of said box side and for holding the same in its folded position while the edge of the material applied to the adjacent box side is folded, a folder for folding the edge of the material applied to said adjacent side of the box over the edge of said box side, said folders being formed to extend substantially to the ends of the box sides and the first mentioned folder having a part arranged to retreat as the second folder makes its folding movements, and a plunger for folding said folded edge of the covering material inward against the inner faces of the box sides, substantially as described.

93. The combination with means for folding a strip of covering material about the sides of a box, edge folders for folding the edges of the portions of the strip applied to opposite sides of the box, edge folders for folding the edges of the portions of the strip applied to the other sides of the box, means for operating the first said edge folders to fold the edges of the strip before the second said edge folders make their folding movements and for holding the edges of the strip in their folded position while the second said edge folders make their folding movements, the first said edge folders being provided with end portions 245 adapted to yield as the second said edge folders make their folding movements, substantially as described.

94. The combination with means for applying covering material to the sides of a box, means for folding one edge of the covering material against the bottom of the box and the other edge of the covering material over the edges of the box sides, a folding plunger for folding the last mentioned edge of the covering material inward against the inner faces of the box sides and for pressing the bottom of the box against means resisting such pressure by engaging the portions of the covering material folded against the bottom of the box, substantially as described.

95. The combination of a box support, means for holding the bottom of a box against said support, means for applying covering material to the sides of the box, edge folders for folding one edge of the covering material against the bottom of the box, means for folding the other edge of the covering material over the edges of the box sides, a folding plunger for folding the last mentioned edge of the covering material inward against the inner faces of the box sides and for forcing said support against the bottom of the box to press the bottom of the box against said edge folders, substantially as described.

96. The combination of means for applying covering material to the sides of a box, sliding edge folders for folding the edge of the covering material against the bottom of the box, and means for pressing the bottom of the box against said folders, substantially as described.

97. The combination with means for applying covering material to the sides of the box, edge folders for folding the edge of the covering material over the edges of the box sides, and a folding plunger for folding said folded edge of the covering material inward against the inner faces of the box sides, said edge folders being yieldingly mounted and being adapted to be forced outward by the folding plunger as the latter makes its folding movement, substantially as described.

98. The combination with means for applying covering material to the side of a box, an edge folder for folding the edge of the covering material over the edge of the box side, and a folding plunger for folding the edge of the covering material inward against the inner face of the box side, said edge folder being yieldingly mounted and adapted to be forced outward by the folding plunger as the latter makes its folding movement, substantially as described.

99. In a box making machine, a web folding and presser mechanism comprising a frame open at one side and carrying therein a plurality of presser shoes conforming to a box part, plates on each side of each shoe, whereby the edges of the web adjacent thereto are turned at right angles to the side of the box part, means folding the ends of the web over the portion of the box part not acted on by said presser shoes, means respectively pressing said ends upon said part, and folding the edges thereof at right angles to the side of the part, means folding in those edges of the web turned across the edge of the top of the part by said plates and said last mentioned means, and means actuating the said elements.

100. In a box making machine, a web folding and presser mechanism comprising a frame open at one side and carrying therein a plurality of presser shoes conforming to a box part, plates on each side of each shoe, whereby the edges of the web adjacent thereto are turned at right angles to the side of the box part, one of said plates being movable independently of its presser whereby it may be automatically forced backward substantially flush therewith, means folding the ends of the web over the portion of the box part not acted on by said presser shoes, means respectively pressing said ends upon said part, and folding the edges thereof at right angles to the side of the part, means forcing said movable side plates backward and folding in those edges of the web turned across the edge of the top of the part by said plates and said last mentioned means, and means actuating the said elements.

101. In a box making machine, a web folding and presser mechanism comprising a frame open at one side and carrying therein a plurality of presser shoes conforming to a box part, plates on each side of each shoe, whereby the edges of the web adjacent thereto are turned at right angles to the side of the box part, means folding the ends of the web over the portion of the box part not acted on by said presser shoes, a supplemental presser shoe conforming to the portion of the box part not acted on by said shoes in said frame, a side plate on each side thereof, means folding in those edges of the web turned across the edge of the top of the part by said plates on all said shoes, and means actuating the said elements.

102. In a box making machine, a web folding and presser mechanism comprising a frame open at one side and carrying therein a plurality of presser shoes conforming to a box part, plates on each side of each shoe, whereby the edges of the web adjacent thereto are turned at right angles to the side of the box part, means folding the ends of the web over the portion of the box part not acted on by said presser shoes, a supplemental presser shoe conforming to the portion of the box part not acted on by said shoes in said frame, a side plate on each side thereof, one of said side plates on each of said shoes and on the same side relative to each other being movable independently of its presser whereby it may be automatically forced backward substantially flush therewith, means forcing said movable side plates backward and folding in those edges of the web turned across the edge of the top of the box part by said plates, and means actuating the said elements.

103. In a box making machine, a web folding and presser mechanism comprising a frame open at one side and carrying therein a plurality of presser shoes conforming to a box part, plates on each side of each shoe, whereby the edges of the web adjacent thereto are turned at right angles to the side of the box part, means folding the ends of the web over the portion of the box part not acted on by said presser shoes, a supplemental presser shoe conforming to the portion of the box part not acted on by said shoes in said frame, a side plate on each side thereof, one of said side plates on each of said shoes and on the same side relative to each other being movable independently of its presser whereby it may be forced backward substantially flush therewith, a reciprocating platen plunger mounted to one side of, and adapted to enter, said frame whereby said movable side plates are forced backward and those edges of the web turned across the edge of the top of the box part by said plates are turned in, and means actuating said elements.

104. In a box making machine, a web folding and presser mechanism comprising a frame open at one side and carrying therein a plurality of presser shoes conforming to a box part, plates on each side of each shoe, whereby the edges of the web adjacent thereto are turned at right angles to the side of the box part, sliding folders mounted on said frame on each side of the open portion thereof whereby the ends of the web are folded over the portion of the box part in said open portion of said frame, a supplemental presser shoe conforming to the portion of the box part not acted on by said shoes in said frame, a side plate on each side thereof, one of said side plates on each of said shoes being movable independently of its shoe whereby it may be forced backward substantially flush therewith, a reciprocating platen plunger mounted to one side of, and adapted to enter, said frame whereby said movable side plates are forced backward and those edges of the web turned across the edge of the top of the box part by said plates are turned in, and means actuating said elements.

105. In a box making machine, a web folding and presser mechanism comprising a frame open at one side and carrying therein a plurality of presser shoes conforming to a box part, a movable plate on each side of each shoe normally substantially flush with its shoe, one of said plates being movable independently of its shoe and of the other plate whereby it may be forced backward substantially flush with its shoe, when said plates are projected, means folding the ends of the web over the portion of the box part not acted on by said shoes, means respectively pressing said ends upon said part and folding the edges thereof at right angles to the side of the part, means folding in those edges of the web turned across the edge of the top of the part, several means actuating said frame, temporarily projecting said side plates beyond their shoes and actuating the respective means folding the ends of the web, pressing and folding same, and folding in the edges, and means restoring said side plates to their normal position.

106. In a box making machine, a web folding and presser mechanism comprising a frame open at one side and carrying therein a plurality of presser shoes conforming to a box part, a movable plate on each side of each shoe normally substantially flush with its shoe, one of said plates being movable independently of its shoe and of the other plate whereby it may be forced backward substantially flush with its shoe, when said plates are projected, means folding the ends of the web over the portion of the box part not acted on by said shoes, a supplemental presser shoe conforming to the portion of the box part not acted on by said presser shoes, in said frame a side plate on each side thereof, one of said plates being movable independently of its shoe, flexible extensions on each of said plates adapted to be retracted relative to said plate by the projection of the aforesaid side plates, means folding in those edges of the web turned across the edge of the top of the part, several means actuating said frame, temporarily projecting said side plates in said frame beyond their shoes, actuating said supplemental presser, said means folding the ends of the web, and said means folding in the edges, and means restoring said side plates to their normal positions.

107. In a box making machine, a web folding and presser mechanism comprising a frame open at one side and carrying therein a plurality of presser shoes conforming to a box part, a movable plate on each side of each shoe normally substantially flush with its shoe, one of said plates being movable independently of its shoe and of the other plate whereby it may be forced backward substantially flush with its shoe, means folding the ends of the web over the portion of the box part not acted on by said shoes, a supplemental presser shoe conforming to the portion of the box part not acted on by said shoes, a side plate on each side thereof, one of said plates being movable independently of its shoe, flexible extensions on each of said plates adapted to be retracted relative to said plate by the projection of the aforesaid side plates, a reciprocating platen plunger mounted to one side of, and adapted to enter said frame whereby all said independently movable side plates are forced backward and those edges of the web turned across the edge of the top of the box part by said plates are turned in, several means actuating said frame and the presser shoes contained therein, said supplemental presser and said platen whereby after said platen has turned in said edges, said pressers will exert a finishing pressure on the box part, means actuating the means folding over the ends of the web, and means restoring said side plates to their normal position.

108. In a box making machine, a web folding and presser mechanism comprising a rectangular reciprocating frame open at the top, a movable bottom presser mounted therein, a movable plate on each side of and substantially flush with said presser, means carried by said frame whereby both said plates are projected beyond said presser, and one of them may be moved independently of said presser and the other, when said frame is raised, side pressers, a movable side plate on each side of each side presser, and substantially flush therewith, one of which is movable independently of its presser and the other, when said plates are projected, said plates being adapted to turn the edges of the web at right angles to the sides of the box part, means folding the web across the top of said frame and of a box part contained therein, means respectively pressing said ends upon said part and folding the edges at right angles to the side of the part, means actuating said independently movable side plates and turning in those edges of the web turned across the edge of the top of the part by said plates and said last mentioned means, and several means respectively actuating said frame, said side plates of the side presser, said means folding the ends of the web, said means pressing and folding same, and said means turning in the edges.

109. In a box making machine, a web folding and presser mechanism comprising a rectangular reciprocating frame open at the top, a movable bottom presser having friction blocks at each end thereof, rods supporting said presser mounted in said frame, a movable plate on each side of and substantially flush with said presser, means carried by said frame whereby both said plates are projected beyond said presser through the movement of said presser, and one of them may be moved independently of said presser and the other, when said frame is raised, side pressers, a movable side plate on each side of each side presser, and substantially flush therewith, one of which is movable independently of its presser and the other, when said plates are projected, all said plates being adapted to turn the edges of the web at right angles to the side of the box part, means folding the web across the top of said frame and of a box part contained therein, means respectively pressing said ends upon said part and folding the edges at right angles to the side of the part, means actuating said independently movable side plates and turning in those edges of the web turned across the edge of the top of the part by said plates and said last mentioned means, and several means respectively actuating said frame, said side plates of said side pressers, said means folding the ends of the web, said means pressing and folding same and said means turning in the edges.

110. In a box making machine, a web folding and presser mechanism comprising a rectangular reciprocating frame open at the top, a movable bottom presser mounted therein, a movable plate on each side of and substantially flush with said presser, a spring pressed plunger pin mounted in and projecting from each end of each said plate, means carried by said frame whereby both said plates are projected beyond said presser, and one of them may be moved independently of said presser and the other when said frame is raised, side pressers, a movable side plate on each side of each side presser and substantially flush therewith, one of which is movable independently of the other and its presser when said plates are projected, all said plates being adapted to turn the edges of the web at right angles to the side of the box part, means folding the web across the top of said frame and of a box part contained therein, means respectively pressing said ends upon said part and folding the edges at right angles to the side of the part, means actuating said independently movable side plates and turning in those edges of the web turned across the edge of the top of the part by said plates and said last mentioned means, and several means respectively actuating said frame, said side plates of the side pressers, said means folding the ends of the web, said means pressing and folding same, and said means turning in the edges.

111. In a box making machine, a web folding and presser mechanism comprising a rectangular reciprocating frame open at the top, a movable bottom presser mounted therein, a movable plate on each side of and substantially flush with said presser, means carried by said frame whereby both said plates are projected beyond said presser, and one of them may be moved independently of said presser and the other when said frame is raised, movable side pressers mounted in said frame, a movable side plate mounted in said frame on each side of each said presser, and substantially flush therewith, one of which is movable independently of its presser and the other, when said plates are projected, all said plates being adapted to turn the edges of the web at right angles to the side of the box part, means folding the web across the top of said frame and of a box part contained therein, means respectively pressing said ends upon said part and folding the edges at right angles to the side of the part, means actuating said independently movable side plates and turning in those edges of the web turned across the edge of the top of the part by said plates and said last mentioned means, and several means respectively actuating said frame, said side pressers, said side plates of said side pressers, said means folding the ends of the web, said means pressing and folding same, and said means turning in the edges.

112. In a box making machine, a web folding and presser mechanism comprising a rectangular reciprocating frame open at the top and having ways in each side thereof connected by a slot, a movable bottom presser mounted therein, a movable plate on each side of and substantially flush with said presser, means carried by the frames whereby both said plates are projected beyond said presser, and one of them may be moved independently of said presser and the other when said frame is raised, a bevel on said independently movable plate, movable side pressers, a stem on each mounted in said frame, a spring acting on said stem, a movable side plate having extensions thereon mounted in said ways, the extensions of one of said plates having a slot therein, springs acting on said independently movable plates, a bevel on each said plate, cross heads carried by the other plate extending through said slots in said frame and said extension, a controlling pin carried by this plate having a head extended over the said stem, a spring acting on said pin to normally hold said plates substantially flush with said presser, all said plates being adapted to turn the edges of the web at right angles to the side of the box part, means folding the web across the top of said frame and of a box part contained therein, means respectively pressing said ends upon said part and folding the edges at right angles to the side of the part, means actuating said independently movable side plates through the bevels thereon and turning in those edges of the web turned across the edge of the top of the part by said plates and said last mentioned means, and several means respectively actuating said frame, said controlling pins, said means folding the ends of the web, said means pressing and folding same, and said means turning in the edges.

113. In a box making machine, a web folding and presser mechanism comprising a rectangular reciprocating frame open at the top and having ways in each side thereof connected by a slot, a movable bottom presser mounted therein, a movable plate on each side of and substantially flush with said presser, means carried by the frame whereby both said plates are projected beyond said presser and one of them may be moved independently of said presser and the other, a bevel on said independently movable plate, side pressers, a movable side plate having extensions thereon mounted in said ways, the extensions of one of said plates having a slot therein, springs acting on said independently movable plates, a bevel on each said plate, cross heads carried by the other plate extending through said slots in said frame and said extensions, a controlling pin carried by this plate, a spring acting on said pin to normally hold said plates substantially flush with said presser, all said plates being adapted to turn the edges of the web at right angles to the side of the box part, means folding the web across the top of said frame and of a box part contained therein, means respectively pressing said ends upon said part and folding the edges at right angles to the side of the part, means actuating said independently movable side plates through the bevels thereon and turning in those edges of the web turned across the edge of the top of the part by said plates and said last mentioned means, and several means respectively actuating said frame, said controlling pins, said means folding the ends of the web, said means pressing and folding same, and said means turning in the edges.

114. In a box making machine, a web folding and presser mechanism comprising a rectangular reciprocating frame open at the top, a movable bottom presser having friction blocks at each end thereof, rods supporting said presser mounted in said frame, a movable plate on each side of and substantially flush with said presser, a ridge on the bottom of said frame having on opposite sides thereof respectively a plurality of studs and a plurality of spring contacts adapted to engage and project said plates beyond said bottom presser, when said frame is raised, side pressers, a movable side plate on each side of each side presser and substantially flush therewith, one of which is movable independently of its shoe and the other, when said plates are projected, all said plates being adapted to turn the edges of the web at right angles to the sides of the box part, means folding the ends of the web across the top of said frame and of a box part contained therein, means respectively pressing said ends upon said part and folding the edges at right angles to the side of the part, means actuating said independently movable side plates and turning in those edges of the web turned across the edge of the top of the part, by said plates and said last mentioned means, and several means raising and lowering said frame, actuating said means folding over the ends of the web, said side plates of said side pressers, said means folding and pressing said ends of said web, and said means turning in the edges.

115. In a box making machine, the combination with a folding and presser mechanism of a track or guide adjacent thereto, means retaining a web end at one end of said track or guide, a carrier mounted on said track or guide, means reciprocating said carrier, gripper jaws mounted on said carrier, a beveled swivel arm mounted adjacent to said track or guide, and said retaining means, means normally holding said bevel in operative position, whereby said jaws are opened by said beveled swivel arm when approaching said retaining means upon their return movement, and swivel said arm upon the direct movement, means toward the limit of the direct movement of said carrier whereby said jaws are opened to release said web, and means separating said web into lengths as fed by the direct movement of said jaws.

116. In a box making machine, the combination with a folding and presser mechanism of a track or guide adjacent thereto, means retaining a web end at one end of said track or guide, a carrier mounted on said track or guide, means reciprocating said carrier, gripper jaws mounted on said carrier, a beveled swivel arm mounted adjacent to said track or guide and said retaining means, means normally holding said bevel in operative position whereby said jaws are opened by said beveled swivel arm when approaching said retaining means upon their return movement, and swivel said arm upon the direct movement, a fixed bevel toward the limit of the direct movement of said carrier, a scraper adjacent thereto whereby said web and adhesive is removed from said jaws, means actuating said scraper, and means separating said web into lengths as fed by the direct movement of said jaws.

117. In a box making machine, the combination with a folding and presser mechanism of a track or guide adjacent thereto, means retaining a web end at one end of said track or guide, a carrier mounted on said track or guide, means reciprocating said carrier, gripper jaws mounted on said carrier, a beveled swivel arm mounted adjacent to said track or guide and said retaining means, means normally holding said bevel in operative position whereby said jaws are opened by said beveled swivel arm when approaching said retaining means upon their return movement, and swivel said arm upon the direct movement, a fixed bevel toward the limit of the direct movement of said carrier, a pivot piece, a knife edge scraper thereon, a lever having one arm in engagement with said piece, a bevel on the other arm projected in the path of said carrier, means restoring said parts to their normal positions, and means separating said web into lengths as fed by the direct movement of said jaws.

118. In a box making machine, the combination with a folding and presser mechanism, of a carrier, gripper jaws mounted thereon, means actuating said jaws whereby they will alternately engage and release the end of a web, means reciprocating said carrier whereby a web is fed relative to said mechanism, shears adjacent to the point of the start of the reciprocating movement, a spring tending to normally close said shears, an oscillating lever, rollers thereon engaging said shears and means actuating said lever substantially simultaneously with the limit of the direct movement of said carrier whereby said spring is permitted to close said shears to separate said web into lengths as fed by the direct movement of said jaws.

119. In a box making machine, the combination with a folding and presser mechanism, of a carrier, gripper jaws mounted thereon, means actuating said jaws whereby they will alternately engage and release the end of a web, means reciprocating said carrier whereby a web is fed relative to said mechanism, shears adjacent to the point of the start of the reciprocating movement, spring pressed cleaning plates on opposite sides of one of the shear blades, a spring normally tending to close said shears, an oscillating lever, rollers thereon engaging said shears and means actuating said lever substantially simultaneously with the limit of the direct movement of said carrier, whereby said spring is permitted to close said shears to separate said web into lengths as fed by the direct movement of said jaws.

120. In a box making machine, a web folding and presser mechanism comprising a rectangular frame open at the top and carrying therein a bottom and side pressers, side plates thereon respectively, one of each of said plates being movable independently of its presser and the other, sliding top folders mounted on said frame, a top presser, side plates thereon one of which is movable independently of its presser, and the other, a platen plunger, means respectively raising and lowering said frame, actuating the various side plates therein, said top presser, said top folders and said platen plunger, in combination with a web feed mechanism comprising a carrier, gripper jaws thereon extending over said frame when lowered, means actuating said jaws whereby they will alternately engage and release the end of the web, means reciprocating said carrier whereby a web is laid across the top of said frame, and means separating a web into lengths as fed by said gripper.

121. In a box making machine, a web folding and presser mechanism comprising a rectangular frame open at the top, a contact on the lower portion thereof and carrying therein a bottom and side presser, side plates thereon respectively, one of each of said plates being movable independently of its presser and the other, sliding top folders mounted on said frame, a top presser, side plates thereon one of which is movable independently of its presser and the other, a platen plunger, means respectively raising and lowering said frame, actuating the various side plates therein, said top presser, said top folders and said platen plunger, in combination with a web feed mechanism comprising a carrier, gripper jaws pivotally mounted thereon and adapted to be swiveled by said contact, means righting said jaws after they have passed said frame, said jaws being extended over said frame when lowered, means actuating said jaws whereby they will alternately engage and release the end of a web, means reciprocating said carrier whereby a web is laid across the top of said frame and said gripper will be returned while said frame is raised, and means separating a web into lengths as fed by said gripper.

122. In a box making machine, a web folding and presser mechanism comprising a rectangular frame open at the top and carrying therein a bottom and side pressers, a contact on the lower portion thereof, side plates on said pressers respectively, one of each of said plates being movable independently of its presser and the other, sliding top folders mounted on said frame, a top presser, side plates thereon one of which is movable independently of its presser and the other, a platen plunger, means respectively raising and lowering said frame actuating the various side plates therein, said top presser, said top folders and said platen, in combination with a web feed mechanism comprising a carrier, gripper jaws pivotally mounted thereon and adapted to be swiveled by said contact, means righting said jaws after they have passed said frame, said jaws being extended over said frame when lowered, and one of said jaws being angular adjacent to its pivot, a spring pressed locking piece mounted on said carrier adjacent to said angular portions, means actuating said jaws whereby they will alternately engage and release the end of a web, means reciprocating said carrier whereby a web is laid across the top of said frame and said gripper will be returned while said frame is raised, and means separating a web into lengths as fed by said gripper.

123. In a box making machine, a web folding and pressing mechanism comprising a rectangular frame open at the top and carrying therein a bottom and side pressers, a contact on the lower portion thereof, side plates on said pressers respectively, one of each of said plates being movable independently of its presser and the other sliding top folders mounted on said frame, a top presser, side plates thereon, one of which is movable independently of its presser and the other, a platen plunger, means respectively raising and lowering said frame, actuating the various side plates therein, said top presser, said top folders and said platen plunger, in combination with a web feeding mechanism comprising a carrier, gripper jaws pivotally mounted thereon and adapted to be swiveled by said contact, a bell crank mounted on said carrier one arm of which engages said jaws, an abutment adapted to engage the other arm of said crank and cause it to right said gripper jaws after they have passed said frame, said jaws being extended over said frame when lowered, means actuating said jaws whereby they will alternately engage and release the end of the web, means reciprocating said carrier whereby a web is laid across the top of said frame and said gripper will be returned while said frame is raised, and means separating a web into lengths as fed by said gripper.

124. In a box making machine, the combination with a forming or setting up die, means feeding blanks relative thereto, plunger rods mounted on opposite sides of said die carrying respectively a reduced face plate, and a forming or setting up plate having reduced edges, and means actuating said plungers respectively, of a web folding and presser mechanism comprising a rectangular frame open at the top, mounted below said die and carrying therein a bottom and side pressers, side plates thereon respectively, one of each of said side plates being movable independently of its presser and the other, sliding top folders mounted on said frame, a plunger sleeve concentric with the rod of said setting or forming up plate, a hollow platen thereon, a top presser mounted above said die, side plates thereon, one of which is movable independently of the other, means feeding a web across the open top of said frame and said top folders and means respectively raising and lowering said frame, actuating the various side plates therein, said top presser, said top folders and said platen plunger sleeve.

125. In a box making machine, the combination with a forming or setting up die, channels disposed about the inner walls thereof, and widened at the far side thereof, a spring pressed block seated in each of said channels, means feeding blanks relative thereto, plunger rods mounted on opposite sides of said die carrying respectively a reduced face plate and a forming or setting up plate having reduced edges, and means actuating said plungers respectively, of a web folding and presser mechanism comprising a rectangular frame open at the top, mounted below said die and carrying therein a bottom and side pressers, side plates thereon respectively, one of each of said side plates being movable independently of its presser and the other, sliding top folders mounted on said frame, a plunger sleeve concentric with the rod carrying said forming or setting up plate, a hollow platen thereon, a top presser mounted above said die, side plates thereon, one of which is movable independently of its presser and the other, means feeding a web across the open top of said frame and said top folders, and means respectively raising and lowering said frame, actuating the various side plates therein, said top presser, said top folders and said platen plunger sleeve.

126. In a box making machine, the combination with a forming or setting up die, means feeding blanks relative thereto, plunger rods mounted on opposite sides of said die carrying respectively a reduced face plate, and a forming or setting up plate having reduced edges, and means actuating said plungers, respectively, of a web folding and presser mechanism comprising a rectangular frame open at the top, mounted below said die, and carrying therein a bottom and side pressers, side plates thereon respectively, one of each of said side plates being movable independently of its presser and the other, sliding top folders mounted on said frame, a plurality of supports adjacent to, and adapted to hold the sides of a box part form as it passes from said die, means removing said supports from the path of said frame, a plunger sleeve concentric with the rod of said forming or setting up plate, a top presser mounted above said die, side plates thereon, one of which is movable independently of its presser and the other, means feeding a web across the open top of said frame and said top folders, and means respectively raising and lowering said frame, actuating the various side plates therein, said top presser, said top folders, and said platen plunger sleeve.

127. In a box making machine, the combination with a forming or setting up die, a swiveling bottom support mounted in said die, means feeding blanks relative thereto, plunger rods mounted on opposite sides of said die carrying respectively a reduced face plate, and a forming or setting up plate having reduced edges, and means actuating said plungers respectively, of a web folding and presser mechanism comprising a rectangular frame open at the top, mounted below said die and carrying therein a bottom and side pressers, side plates thereon respectively, one of each of said side plates being movable independently of its presser and the other, means on said frame for swiveling said support, side and top supports opposite said die, means actuating same, sliding top folders mounted on said frame, a plunger sleeve concentric with the rod of said forming or setting up plate, a hollow platen thereon, a top presser mounted above said die, side plates thereon, one of which is movable independently of the other, means feeding a web across the open top of said frame and said top folders, and means respectively raising and lowering said frame, actuating the various side plates therein, said top presser, said top folders and said platen plunger sleeve.

128. In a box making machine, the combination with a forming or setting up die, means feeding blanks relative thereto, plunger rods mounted on opposite sides of said die carrying respectively a reduced face plate, and a forming or setting up plate having reduced edges, and means actuating said plungers respectively, of a web folding and presser mechanism comprising a rectangular frame open at the top, mounted below said die and carrying therein a bottom and side pressers, side plates thereon respectively one of each of said side plates being movable independently of its presser and the other, sliding top folders mounted on said frame, a reciprocating top support mounted adjacent to said die, a spring pressed yoke adapted to engage the sides of a box part form mounted on said top support, means reciprocating said top support, a plunger sleeve concentric with the rod of said forming or setting up plate, a top presser mounted above said die, side plates thereon, one of which is movable independently of its presser and the other, means feeding a web across the open top of said frame and said top folders, and means respectively raising and lowering said frame, actuating the side plates therein, said top presser said top folders and said platen plunger sleeve.

129. In a box making machine, the combination with a forming or setting up die, a blank magazine disposed below the entering edge of said die, a reciprocating feed plate, means reciprocating said plate, plunger rods mounted on opposite sides of said die carrying respectively a reduced face plate, and a forming or setting up plate having reduced edges, and means actuating said plungers respectively, of a web folding and presser mechanism comprising a rectangular frame open at the top mounted below said die and carrying therein a bottom and side pressers, side plates thereon respectively, one of each of said side plates being movable independently of its presser and the other, sliding top folders mounted on said frame, a plunger sleeve concentric with the rod of said setting or forming up plate, a hollow platen thereon, a top presser mounted above said die, side plates thereon, one of which is movable independently of its presser and the other, means feeding a web across the open top of said frame and said top folders, and means respectively raising and lowering said frame, actuating the various side plates therein, said top presser, said top folders and said platen plunger sleeve.

130. In a box making machine, the combination with a forming or setting up die, means feeding blanks relative thereto, plunger rods mounted on opposite sides of said die carrying respectively a reduced face plate, and a forming or setting up plate having reduced edges, and means actuating said plungers respectively, of a web folding and presser mechanism comprising a rectangular frame open at the top, mounted below said die and carrying therein a bottom and side pressers, side plates thereon respectively, one of each of said side plates being movable independently of its presser and the other, sliding top folders mounted on said frame, a reciprocating top support mounted adjacent to said die, a spring pressed yoke adapted to engage the sides of a box part form mounted on said top support, a rock shaft, crank arms thereon, a pitman connecting one of said arms with said top support, a double acting cam acting on the other said arm, a plunger sleeve concentric with the rod of said forming or setting up plate, a top presser mounted above said die, side plates thereon, one of which is movable independently of its presser and the other, means feeding a web across the open top of said frame and said top folders, and means respectively raising and lowering said frame, actuating the side plates therein, said top presser, said top folders, and said platen plunger sleeve.

131. In a box making machine, a web folding and presser mechanism comprising a rectangular reciprocating frame open at the top and carrying therein a bottom and side pressers, side plates thereon respectively, all the said side plates on one side of said frame being movable independently of its presser and the other, sliding top folders mounted on said frame, a top presser, side plates thereon, one of which is movable independently of its shoe and of the other, a platen plunger, mounted to one side of, and adapted to enter, said frame, several means respectively raising and lowering said frame, actuating the various side plates therein, said top presser, said top folders and said platen plunger, in combination with a web feed mechanism comprising a carrier, gripper jaws thereon extending over said frame when lowered, means actuating said jaws whereby they will alternately engage and release the end of the web, means reciprocating said carrier whereby a web is laid across the top of said frame, an ejector carried by said gripper jaws, and means separating a web into lengths as fed by said gripper.

132. In a box making machine, a web folding and presser mechanism comprising a rectangular reciprocating frame open at the top and carrying therein a bottom and side pressers, side plates thereon respectively, all the said plates on one side of said frame being movable independently of its presser and the other, sliding top folders mounted on said frame, a top presser, side plates thereon, one of which is movable independently of its shoe and the other, a platen plunger, mounted to one side of, and adapted to enter, said frame, several means respectively raising and lowering said frame, actuating the various side plates therein, said top presser, said top folders and said platen plunger, in combination with a web feed mechanism comprising a carrier, gripper jaws thereon extending over said frame when lowered, means holding the end of a web, means actuating said jaws whereby they will alternately engage and release the end of the web, means reciprocating said carrier whereby a web is laid across the top of said frame, an adjustable buffer whereby the movement of said carrier relative to said means holding the end of a web is defined, and means separating a web into lengths as fed by said gripper.

In testimony whereof, I have hereunto set my hand, in the presence of two subscribing witnesses.

FRED R. HARRIS.

Witnesses:
A. L. KENT,
T. E. KEHOE.